United States Patent [19]

Morishima et al.

[11] Patent Number: 5,701,736
[45] Date of Patent: Dec. 30, 1997

[54] APPARATUS FOR PURIFYING EXHAUST GAS

[75] Inventors: Shingo Morishima, Nukata-gun; Jun Yamada, Okazaki; Kenji Kanehara, Toyohashi; Tohru Yoshinaga, Okazaki, all of Japan

[73] Assignee: Nippon Soken, Inc., Nishio, Japan

[21] Appl. No.: 574,044

[22] Filed: Dec. 18, 1995

[30] Foreign Application Priority Data

Dec. 19, 1994 [JP] Japan ................................. 6-334424
Jan. 9, 1995 [JP] Japan ................................. 7-017526

[51] Int. Cl.$^6$ ..................................................... F02M 5/06
[52] U.S. Cl. ............................................................. 60/297
[58] Field of Search ................................. 60/297, 274, 279, 60/286, 302

[56] References Cited

U.S. PATENT DOCUMENTS

| | | |
|---|---|---|
| 4,887,427 | 12/1989 | Shinzawa et al. |
| 5,379,586 | 1/1995 | Honji et al. ............ 60/297 |
| 5,493,859 | 2/1996 | Shinohara et al. ........... 60/297 |
| 5,497,619 | 3/1996 | Yamada et al. ............ 60/297 |
| 5,499,501 | 3/1996 | Kato et al. ............ 60/297 |

FOREIGN PATENT DOCUMENTS 6-212951  8/1994  Japan.

*Primary Examiner*—John T. Kwon
*Attorney, Agent, or Firm*—Cushman, Darby & Cushman IP Group of Pillsbury Madison & Sutro LLP

[57] ABSTRACT

An apparatus for purifying an exhaust gas for an internal combustion engine having units for the adsorption of HC gases in the exhaust gas, arranged in an exhaust manifold of the engine facing corresponding exhaust ports in such a manner that straight flows from the corresponding exhaust ports contact the corresponding adsorption units. A controller receives a signal indicating a temperature of one of a catalytic converter and the adsorption units. The controller sends a signal to a cooling apparatus, such as a fan, indicating a desired on condition of the cooling apparatus based on the temperature signal. The cooling apparatus is provided for generating air flows for cooling the adsorption units. The fan is operated when the engine, in a cold state, is started. The operation of the fan is continued until a catalytic converter arranged downstream from the adsorption units becomes effective, i.e. the temperature of the catalytic converter is higher than a predetermined value.

16 Claims, 20 Drawing Sheets

← FLOW OF HC PARTICLE

○ LARGE HC PARTICLE
• SMALL HC PARTICLE

⇐ FLOW OF SECONDARY AIR
← FLOW OF HC PARTICLE

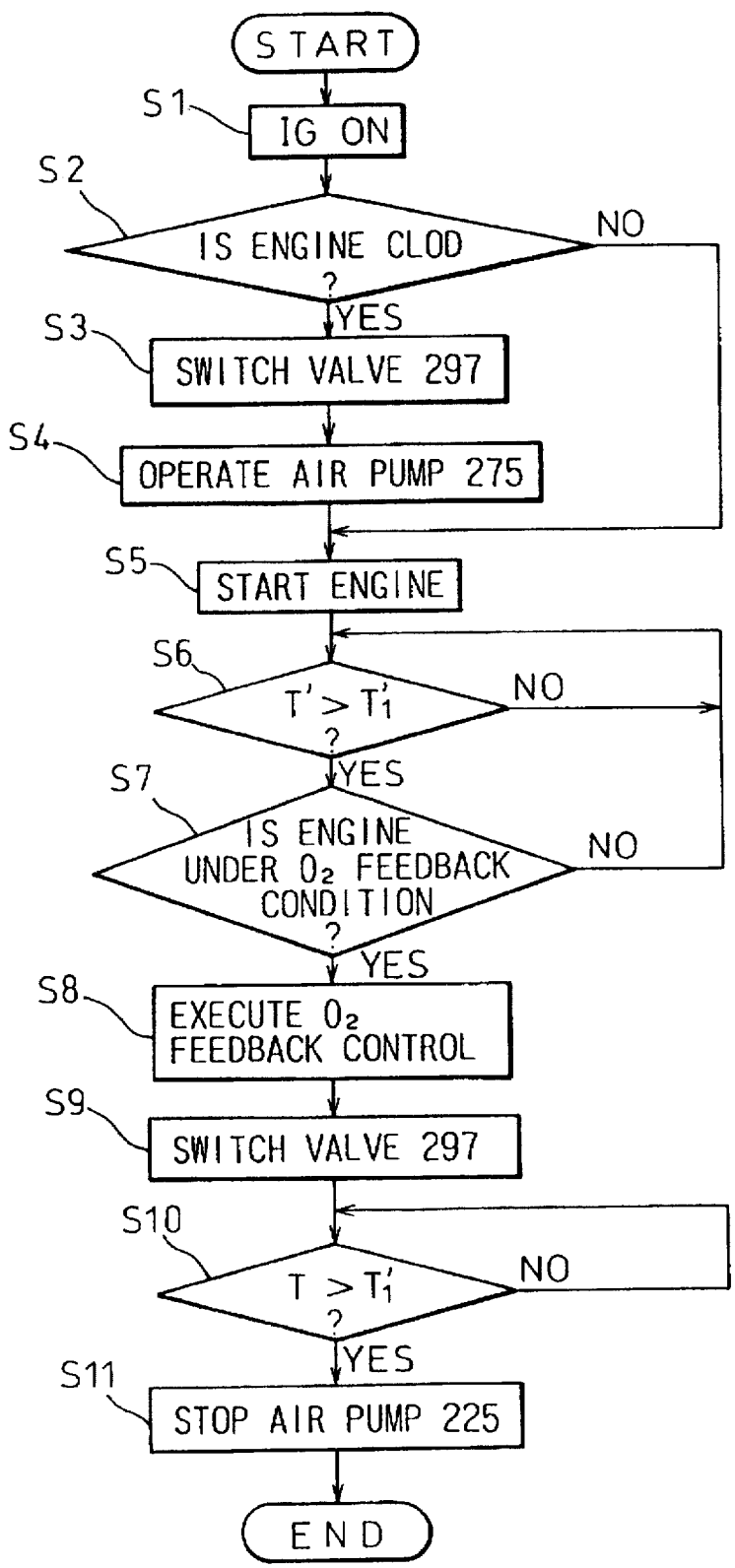

APPARATUS FOR PURIFYING EXHAUST GAS

BACKGROUND OF THE INVENTION

1. Field of the Invention

The present invention relates to a device for purifying an exhaust gas from an internal combustion engine. More particularly, the present invention relates to a device for purifying hydrocarbon (HC) components in an exhaust gas in a gasoline internal combustion engine, which are generated when an engine in a cold condition is started.

2. Description of Related Art

A catalytic converter is usually arranged in an exhaust pipe of an internal combustion engine, so that exhaust gas contacts the catalyst layers of the catalytic converter. As a result, unburnt components, such as hydrocarbon (HC), are purified. However, in order to obtain such an operation, the catalyst must be in an activated condition, i.e., the catalyst must be in a desirable temperature range. Thus, when an engine in a cold condition is started, the exhaust gas purification can not be obtained until the temperature of the catalyst is increased to the desired value.

In order to obviate this problem, Japanese Unexamined Patent Publication No. 6-212951 proposes a solution wherein an adsorption unit is arranged in an exhaust manifold in such a manner that the HC adsorption unit faces an exhaust port of the engine. Due to the arrangement of the adsorption unit with respect to the exhaust port, a straight flow of exhaust gas from the exhaust port first contacts the adsorption unit, so that hydrocarbon components, in the exhaust gas at a low temperature, generated just after the engine is started are captured and temporarily held by the adsorption unit. An increase in the temperature of the exhaust gas causes the hydrocarbon components to be released from the adsorption unit and entrained in the flow of the exhaust gas. The released hydrocarbon components in the flow of the exhaust gas are purified at a catalytic converter located at a downstream position, which is now in an activated condition.

In the above mentioned patent, the adsorption unit is constructed by a casing which is opened only at a side facing the exhaust port, and a carrier body including HC adsorbent housed in the casing. Due to this one end closed structure, the straight flow of the exhaust gas contacting with the HC adsorbent is prevented from being passed through the layer of the HC adsorbent, so that an increase in the temperature to the HC release temperature (about 100° C.) after the start of the engine occurs relatively slowly. As a result, the HC components generated prior to the completion of the activation of the catalytic converter are held in the adsorption unit, on one hand and, on the other hand, the adsorption unit is prevented from being overheated when the temperature of the exhaust gas is high due to the execution of a high load operation.

However, even in the above mentioned improved system, it may be possible that a premature desorption occurs prior to the activation of the catalyst located downstream from the adsorption unit, which causes the HC components to be exhausted without being purified at the catalytic converter. Thus, there has been a long felt need that the adsorption unit is, for a prolonged time, maintained at a low temperature whereat the HC adsorption capacity is high. Furthermore, in the above mentioned prior art system, an arrangement of the exhaust system is such that the exhaust gas is partly directly directed to the exhaust pipe. In other words, lighter components in the exhaust gas are directed to the exhaust pipe without making contact with the adsorption unit, thereby reducing HC adsorption capacity compared to a construction wherein all of the exhaust gas flows into the HC adsorption unit as disclosed in the Japanese Unexamined Patent Publication No. 2 -135126.

Furthermore, it is usual for an internal combustion engine to use a rich air-fuel mixture during a high load operation, which makes the temperature of the exhaust gas low, thereby preventing the catalytic converter from being overheated. However, in order to allow an internal combustion engine to be operated under a theoretical air-fuel ratio, an arrangement is often employed, in a vehicle for use in European countries, wherein a catalytic converter is arranged below a floor of the vehicle, where the temperature of the exhaust gas is relatively low. However, a use of the prior art device (Japanese Unexamined Patent Publication No. 6-212951) in such a type of vehicle will easily cause the temperature of the exhaust gas from an exhaust port to be highly increased, so that the temperature of the adsorption unit is also highly increased, which causes the fine structure of the adsorption unit to be easily damaged.

Furthermore, a substantial gas flow is not generated inside the HC adsorption unit, which prevents the HC gas from being fully subjected to a desorption even after the temperature of the adsorbent is higher than a predetermined desorption temperature, resulting in the HC components being carbonized, thereby reducing the HC adsorption capacity.

SUMMARY OF THE INVENTION

An object of the present invention is to provide an apparatus, for purifying the exhaust gas in an internal combustion engine, which is capable of slowing down an increase in the temperature of the HC adsorption unit when the engine is started, thereby increasing the amount of unburnt HC components captured by the HC adsorption unit.

Another object of the present invention is to provide an apparatus, for purifying an exhaust gas in an internal combustion engine, which is capable of preventing the temperature of the HC adsorption unit from being excessively increased when the engine is in a high load condition.

Still another object of the present invention is to provide an apparatus, for purifying an exhaust gas in an internal combustion engine, which is capable of promoting desorption of the captured HC components after an increase in the temperature of the adsorption unit to a temperature where a desorption operation at the unit is commenced, thereby preventing the desorption layer from being easily damaged.

According to a first aspect of the present invention, an apparatus is provided for purifying an exhaust gas for an internal combustion engine having an engine body including an exhaust port and an exhaust passageway for receiving an exhaust gas from the exhaust port, said apparatus comprising:

means arranged in the exhaust passageway at a location facing the exhaust port for adsorption of the unburnt components in the exhaust gas from the exhaust port;

catalyst means arranged in the exhaust passageway at a location downstream from the adsorption means for purifying the unburnt components in the exhaust gas;

means for detecting, from the condition of the engine, that an increase in the adsorption capacity of the adsorption means is required, and;

cooling means responsive to the detection of the cooling requirement for cooling the adsorption means.

According to the another aspect of the present invention, an apparatus is provided for purifying an exhaust gas for an internal combustion engine having an engine body having an exhaust port and an exhaust passageway for receiving an exhaust gas from the exhaust port, said apparatus comprising:

means arranged in the exhaust passageway at a location facing the exhaust port for unburnt components in the exhaust gas from the exhaust port;

catalyst means arranged in the exhaust passageway at a location downstream from the adsorption means for purifying the unburnt components in the exhaust gas, and;

a honeycomb structured means arranged in the exhaust manifold on one side of the adsorption means adjacent to the exhaust port for discharging heat from the exhaust gas to the atmosphere.

BRIEF EXPLANATION OF ATTACHED DRAWINGS

FIG. 23 is a flowchart illustrating an operation of the sixth embodiment.

DETAILED EXPLANATION OF PREFERRED EMBODIMENTS

Figure 1:
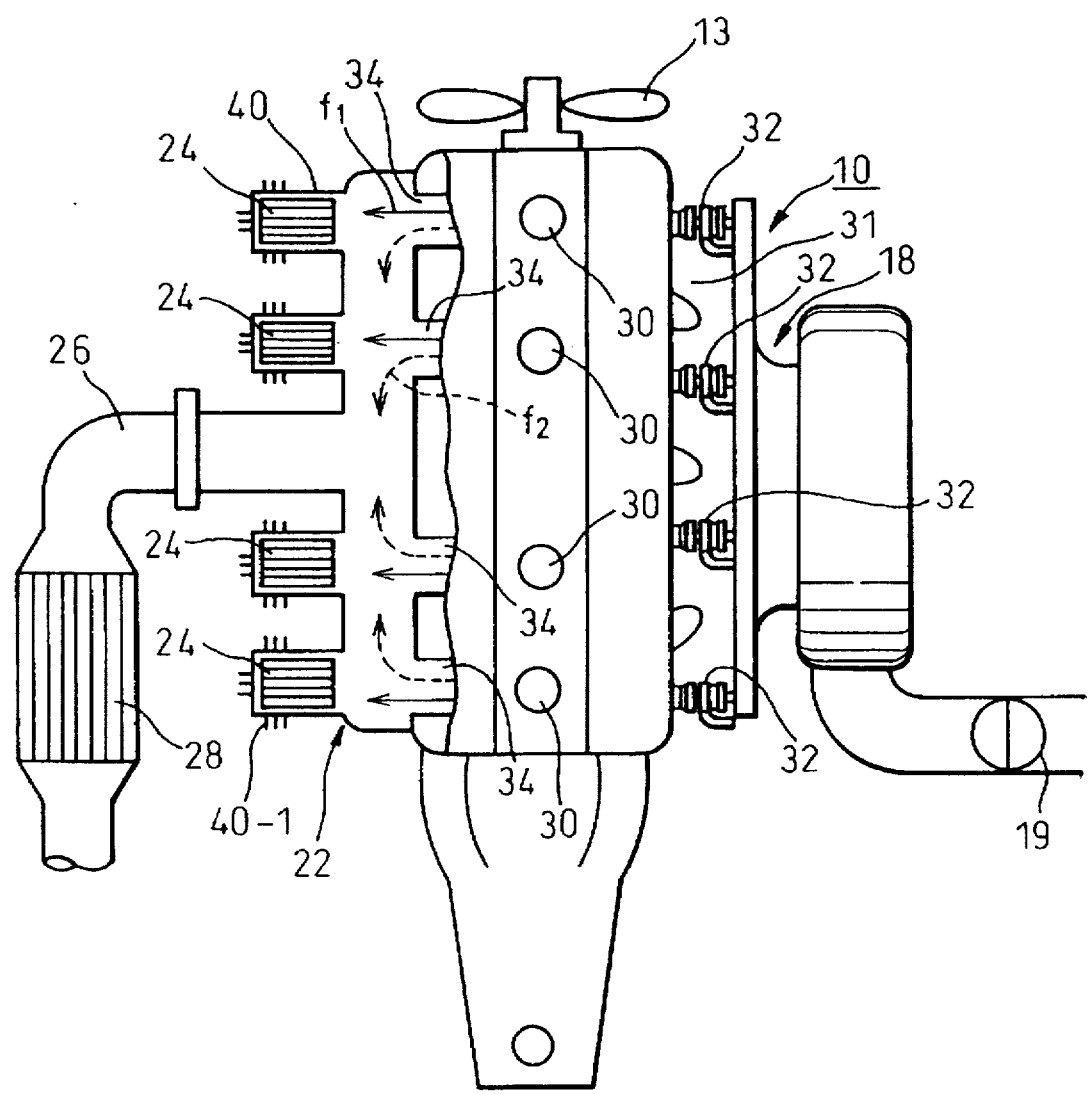
FIG. 1 is a schematic plan view of an internal combustion engine provided with exhaust gas purifying apparatus in a first embodiment according to the present invention.
Figure 2:
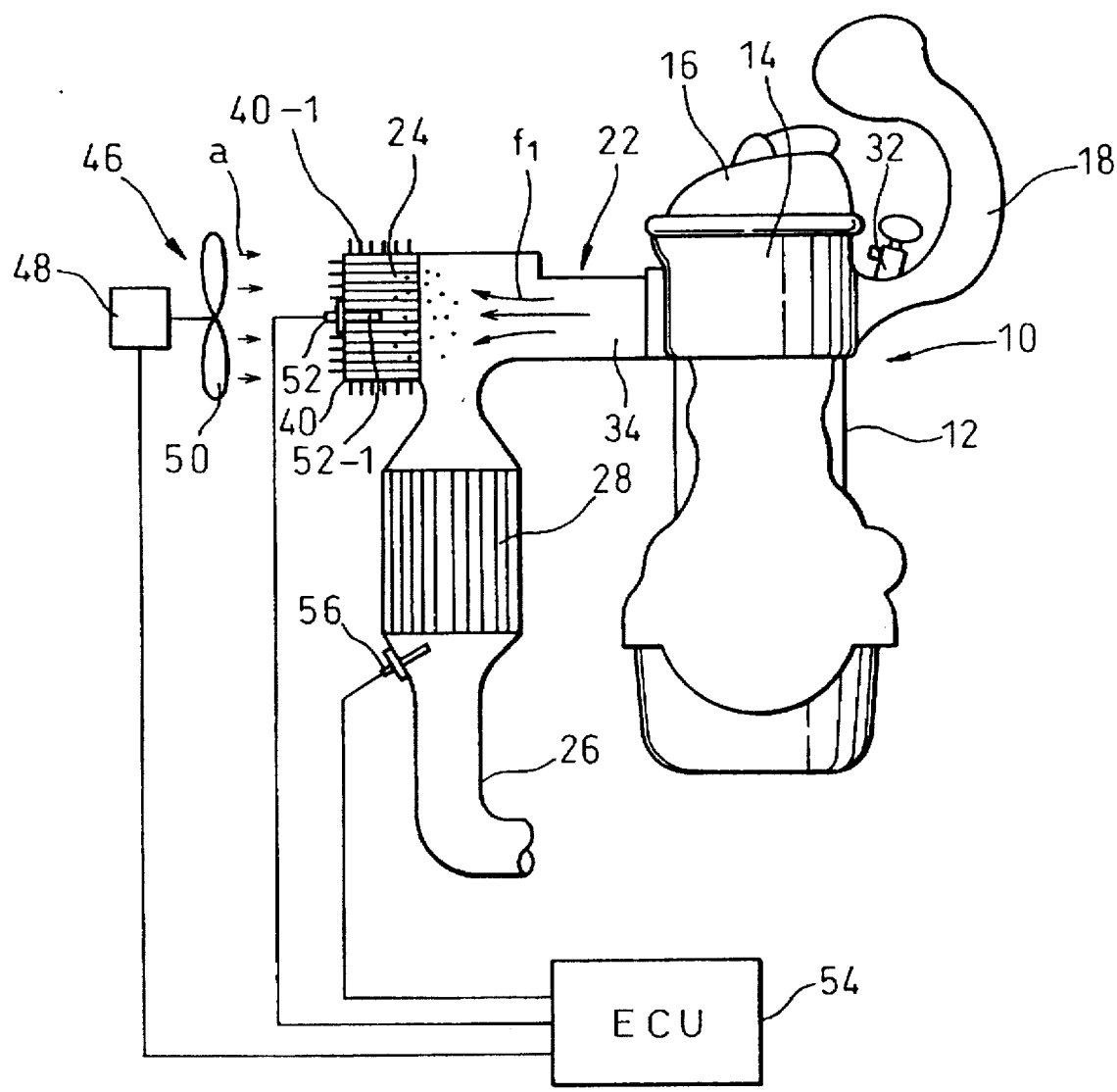
FIG. 2 is a schematic side view of the internal combustion engine in FIG. 1.

In FIGS. 1 and 2, a reference numeral 10 denotes a gasoline injection internal combustion engine which includes a cylinder block 12, a cooling fan 13, a cylinder head 14, a cylinder head cover 16, an intake manifold 18, a throttle valve 19, an exhaust manifold 22, an adsorption unit or assembly 24, an exhaust pipe 26 and a catalytic converter 28. As shown in FIG. 1, the internal combustion engine is provided with four cylinders 30. Thus, the intake manifold 18 is formed with four branch pipes 31, which are connected, via respective intake ports (not shown) in the cylinder head 14, to the cylinders 30, respectively. Fuel injection valves 32 are mounted to the respective branch pipes 31, so that the gasoline is injected into the respective intake ports. The exhaust manifold 22 is connected, via respective exhaust ports 34 in the cylinder head 14, to the respective cylinders 30 for receiving a resultant exhaust gas therefrom.

Figure 3:
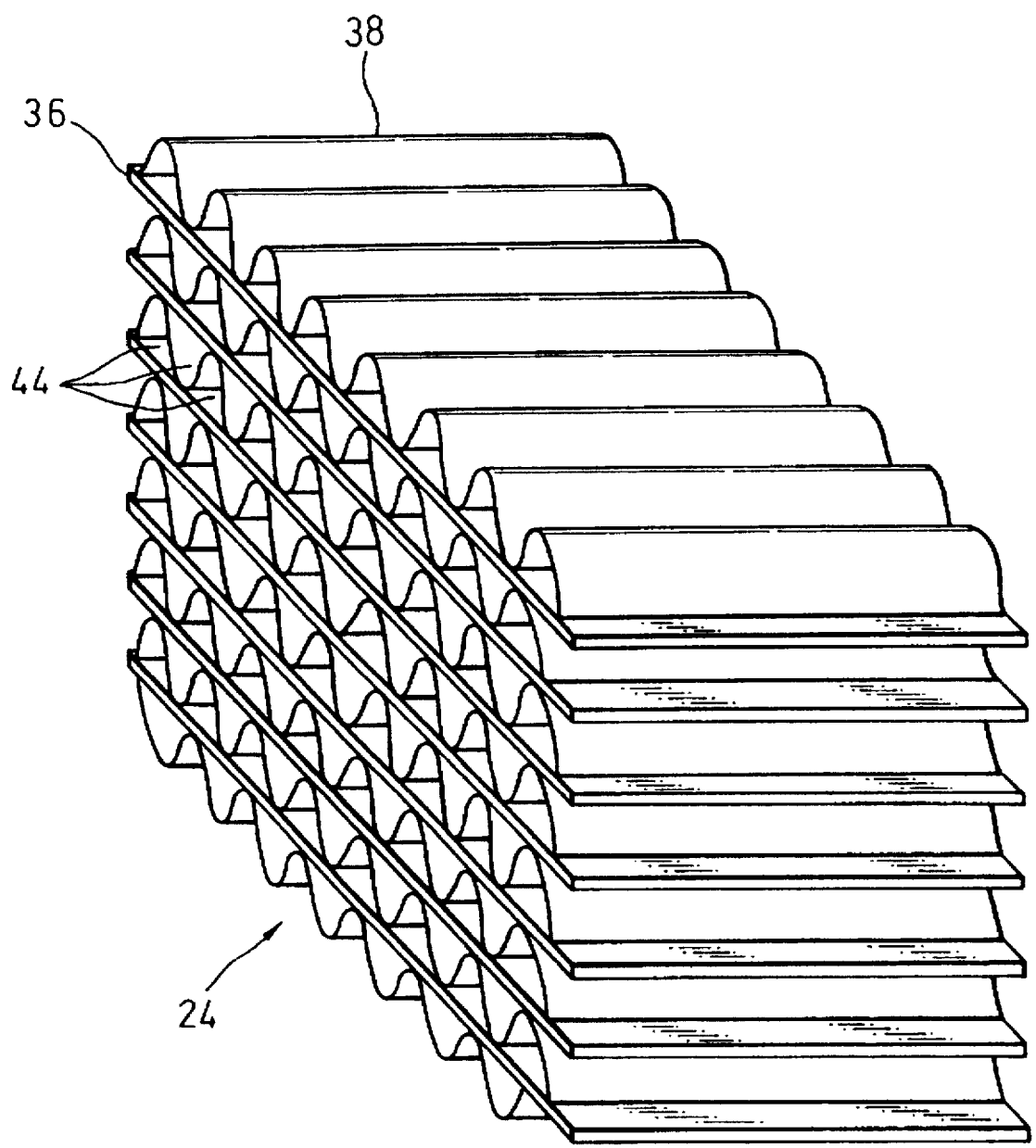
FIG. 3 is a schematic perspective view of a adsorption unit in FIG. 1.

The exhaust manifold 22 is formed with recessed or casing portions 40, which face the corresponding exhaust ports 34 and in which the respective adsorption units 24 are stored. The adsorption units 24 face the corresponding exhaust ports 34, so that straight flows of the exhaust gas from the corresponding exhaust ports 34 as shown by arrows $f_1$ first contact the corresponding adsorption units 24. The adsorption unit 24, as shown in FIG. 3, includes a carder body formed as a stack of flat plates 36 and corrugated plates 38, which are arranged alternately and are both made of stainless steel of a thickness of about 50 µm, and a surface coating of adsorbent such as a zeolite. As a result, the alternate arrangement of the corrugated and flat plates 36 and 38 constructs a carrier body with a plurality of longitudinal passageways 44. The carrier body (the stack of the plates 36 and 38) is stored in the corresponding casing portion 40 so that the passageways 44 are, at the ends thereof, opened to the exhaust port 34, so that a straight flow of exhaust gas, as shown by the arrows $f_1$ first contacts the carrier body. As a result, during starting of the engine, at a low temperature, HC components in the exhaust gas are subjected to an adsorption operation by the surface coating of the adsorption unit 24, and the captured HC components are subjected to a desorption when the engine is warmed-up, i.e., the temperature of the exhaust gas is increased.

Figure 4:
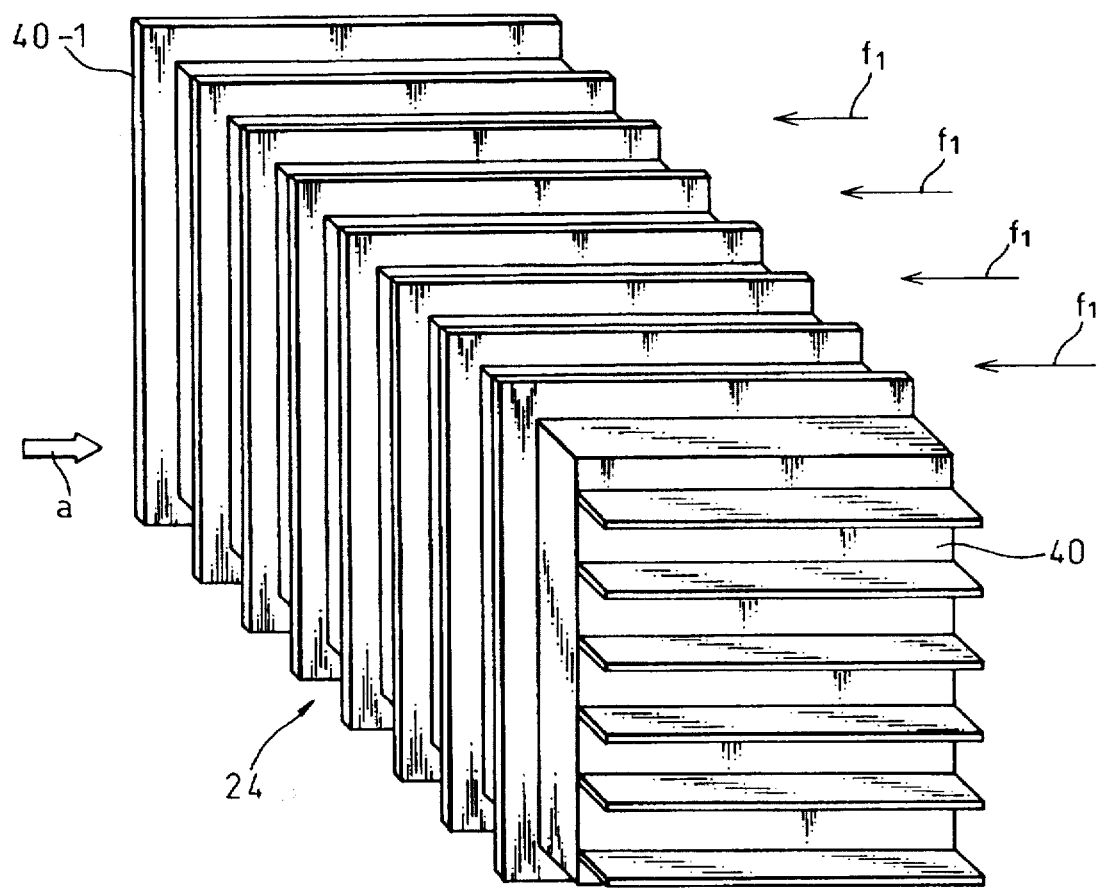
FIG. 4 is a schematic perspective view of a case of the adsorption unit in FIG. 1.

As shown in FIG. 2, each of the casing portions 40 of the intake manifold 22 is formed, at its outer wall, with a plurality of fins 40-1 (FIG. 4), which are integrally formed with the wall of the casing portion 40 or connected thereto by a suitable means such as welding or brazing. Furthermore, as shown in FIG. 2, a cooling device 46 is provided, which has an electric motor 48 and a fan 50 which is arranged to face the casing portions 40 of the exhaust manifold 22, so that a flow of cooling air as shown by arrow a (FIG. 4), directed to the fins 40-1, is created. Furthermore, a temperature sensor 52 is connected to the exhaust manifold and has a detecting head portion 52-1 extending to the middle part of the adsorption unit 24. The temperature sensor 52 detects the temperature of the HC adsorption unit 24 and issues an electric signal indicating the temperature. This electric signal is introduced into a control unit 54 constructed as a microcomputer unit, which controls, as will be fully described later, the operation of the cooling fan device 46. As shown in FIG. 2, a temperature sensor 56 is connected to the exhaust pipe 26 at a location downstream from the catalytic converter 28. It should be noted that, in the instant embodiment, the fan device 46 having the fan 50 is used for generating the air flow a for cooling the adsorption unit 24. However, in place of the provision of the independent cooling device, a duct can be provided for directing an air flow generated by the engine cooling fan 13 (FIG. 1) to the adsorption unit 24.

Figure 5:
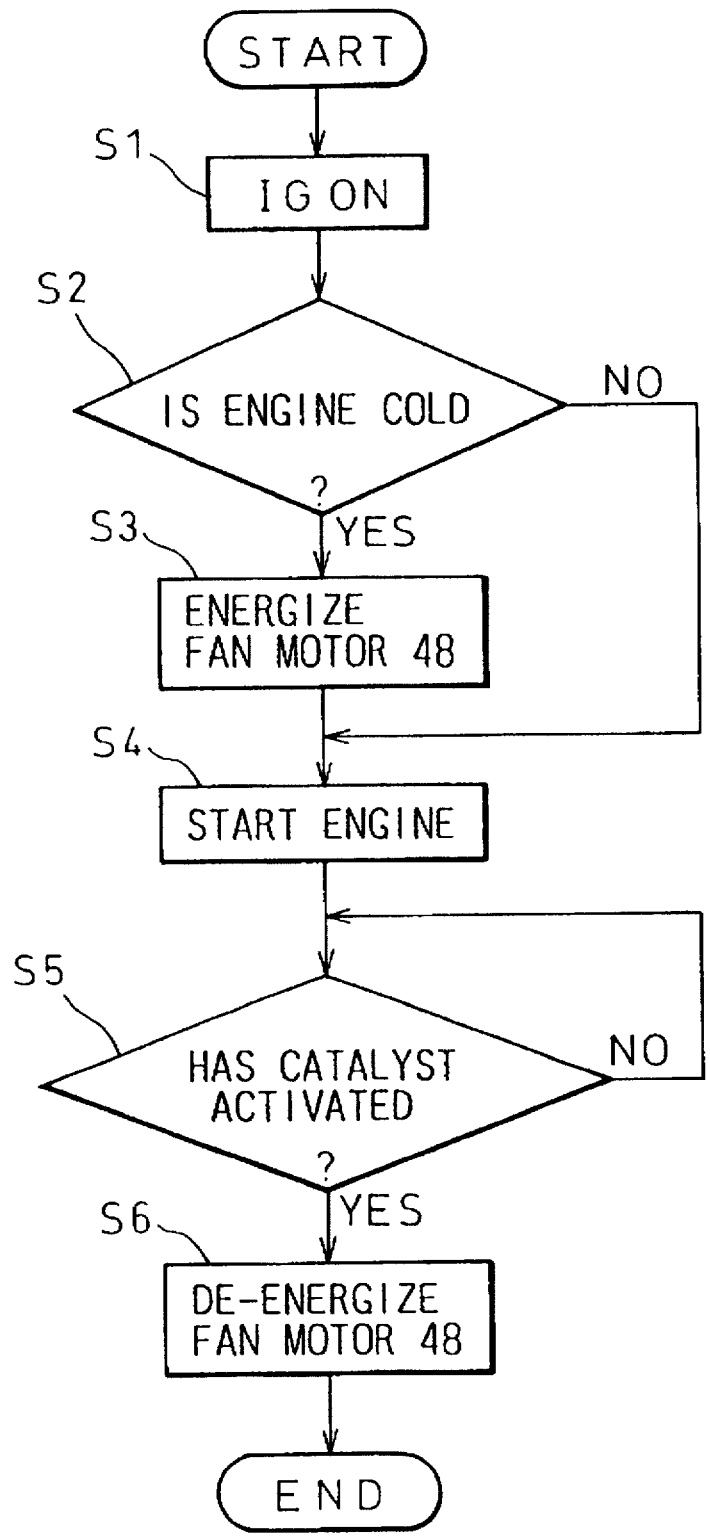
FIG. 5 is a flowchart illustrating an operation of the first embodiment during a cold start of the engine.

Now, an operation of the first embodiment of the present invention will be explained with reference to a flowchart in FIG. 5. This routine starts when an ignition switch (not show) of the internal combustion engine is turned ON (step S1). At step S2, it is determined if the engine is cold. When a determination that the engine is cold is obtained, the routine goes to step S3, where the fan motor 48 is energized, which causes the fan 50 to be rotated, thereby generating an air flow as shown by arrows a in FIG. 2. Then, at step S4 the operation of the engine is commenced. When a determination that the engine is not cold is obtained, the step S3 is by-passed, and the routine goes to step S4, and the operation of the engine is commenced. At step S5, it is determined if the catalyst is activated, i.e., the temperature of the exhaust gas in the exhaust pipe 26, at a location adjacent to and downstream from the catalytic converter 28 and detected by the sensor 56, is higher than a predetermined value such as 400° C. The operation of the fan motor 48 is continued so long as the temperature of the exhaust gas detected by the sensor 56 is less than 400° C. When it is determined that the catalyst is activated, i.e., the exhaust gas temperature is higher than 400° C., the routine goes to step S6, where the electric motor 48 of the fan device 46 is stopped, thereby stopping the air flow as shown by arrows a in FIG. 2.

During the cold state of the internal combustion engine, a large amount of unburnt hydrocarbon (HC) components is included in the exhaust gas discharged from the exhaust ports 34. During a cranking state of the internal combustion engine, the pressure in the adsorption unit is relatively small, on one hand, and the exhaust gas includes a large amount of unburnt gas (the HC components) which is relatively heavy. An inertia force thus causes the exhaust gas to flow along a straight line, as shown by the arrow $f_1$ in FIG. 2, causing the gas to contact the adsorption unit 24. As a result, the HC components are caught by the adsorption unit 24. Simultaneously, the air flow a generated by the fan 50 as it is rotated contacts with fins 40-1, thereby cooling the adsorption unit 24. As a result, the adsorption unit 24 does not easily increase in temperature, which allows the HC component adsorption capacity to be prolonged. After a complete combustion state in the engine is obtained, the pressure in the adsorption unit 24 is increased, thereby preventing the flow of the exhaust gas from being introduced into the adsorption unit 24. The flow of the exhaust gas after the complete combustion state of the engine is shown by arrows $f_2$ in FIG. 1. As a result, the HC components generated during the cranking and held by the adsorption unit 24 are prevented from being subjected to desorption. Thus, the HC components can be kept in the adsorption unit 24 until the activated state of the catalytic converter 28 is obtained, i.e., the catalytic converter 28 is heated to the predetermined activated temperature (400° C.). In other words, an emission of hydrocarbon components is effectively prevented. When the predetermined activated temperature (400° C.) of the catalytic converter 28 is obtained, the cooling fan device 46 is stopped. The stoppage of the fan device 46 causes the temperature of the adsorption unit 24 to be quickly increased, which causes the captured HC components to be subjected to desorption and to be effectively captured by means of the catalytic converter 28, which is in the activated condition.

Figure 6:
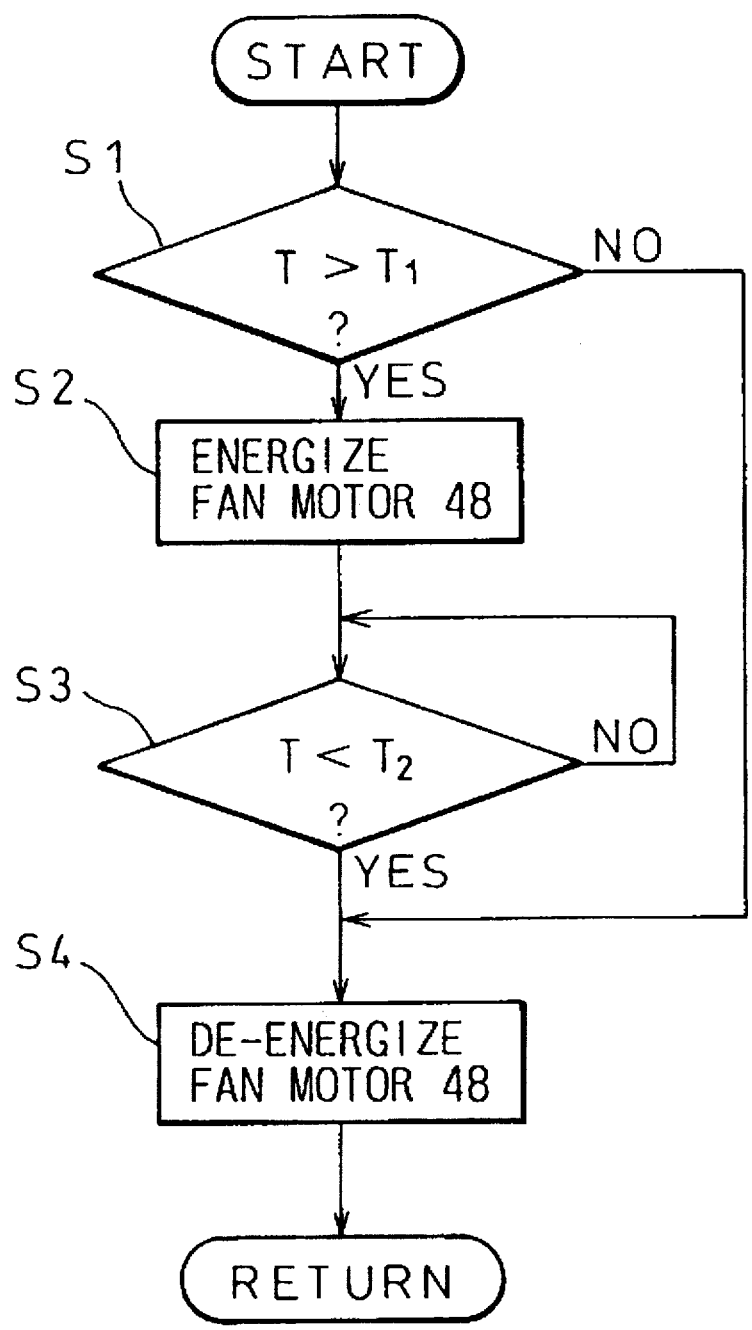
FIG. 6 is a flowchart illustrating an operation of the first embodiment during a high load condition of the engine.

Now, an operation during an engine high load condition will be explained with reference to a flowchart in FIG. 6. This routine starts when a load on the engine is high. At step S1, it is determined if the temperature of the HC adsorption unit sensed by the sensor 52, is greater than a predetermined value $T_1$ of, for example, a value of about 700° C., which is a maximum allowable temperature limit for the adsorption unit 24, while the free construction of the latter is prevented from being damaged. When it is determined that the temperature T of the HC adsorption unit 24 sensed by the sensor 52 is higher than the predetermined value $T_1$, the routine goes to step S2, where the electric motor 48 is energized, causing the fan motor 48 to be operated. At step S3, it is determined if a temperature of the HC adsorption unit 24, sensed by the sensor 52, is smaller than a predetermined value $T_2$ of, for example, a value of about 600° C., which is smaller than the predetermined value $T_1$. So long as a determination is obtained that the temperature of the HC adsorption unit is higher than a predetermined value $T_2$, the operation of the fan is continued. When a determination that the temperature of the HC adsorption unit is lower than a predetermined value $T_2$, the routine goes to step S4, where the operation of the fan motor 48 is stopped. In short, an operation of the cooling fan 50 is commenced when the temperature of the adsorption unit 24 exceeds the upper limit $T_1$, which causes the air flow as shown by the arrow a to be generated, thereby cooling the adsorption unit 24. The operation of the fan 50 is continued until the temperature of the adsorption unit 24 is reduced below the predetermined value $T_2$. The difference of values between $T_1$ and $T_2$ is determined so that a desired hysteresis characteristic is obtained, thereby preventing the cooling fan motor 48 from being frequently switched between an ON and OFF condition, i.e., preventing hunting from occurring.

In short, in the above embodiment, the provision of the cooling fan 50 can stop the temperature of the adsorption unit 24 from being increased, which allows the HC adsorption capacity to be increased when a cold engine is started, on one hand and, on the other hand, prevents the fine structure of the HC adsorption unit 24 from being damaged by the heat of the exhaust gas. Furthermore, the provision of the cooling fins 40-1 at the outer wall of the adsorption unit 24 can promote heat emission therefrom, which can increase the cooling performance of the fins 40-1.

Figure 7:
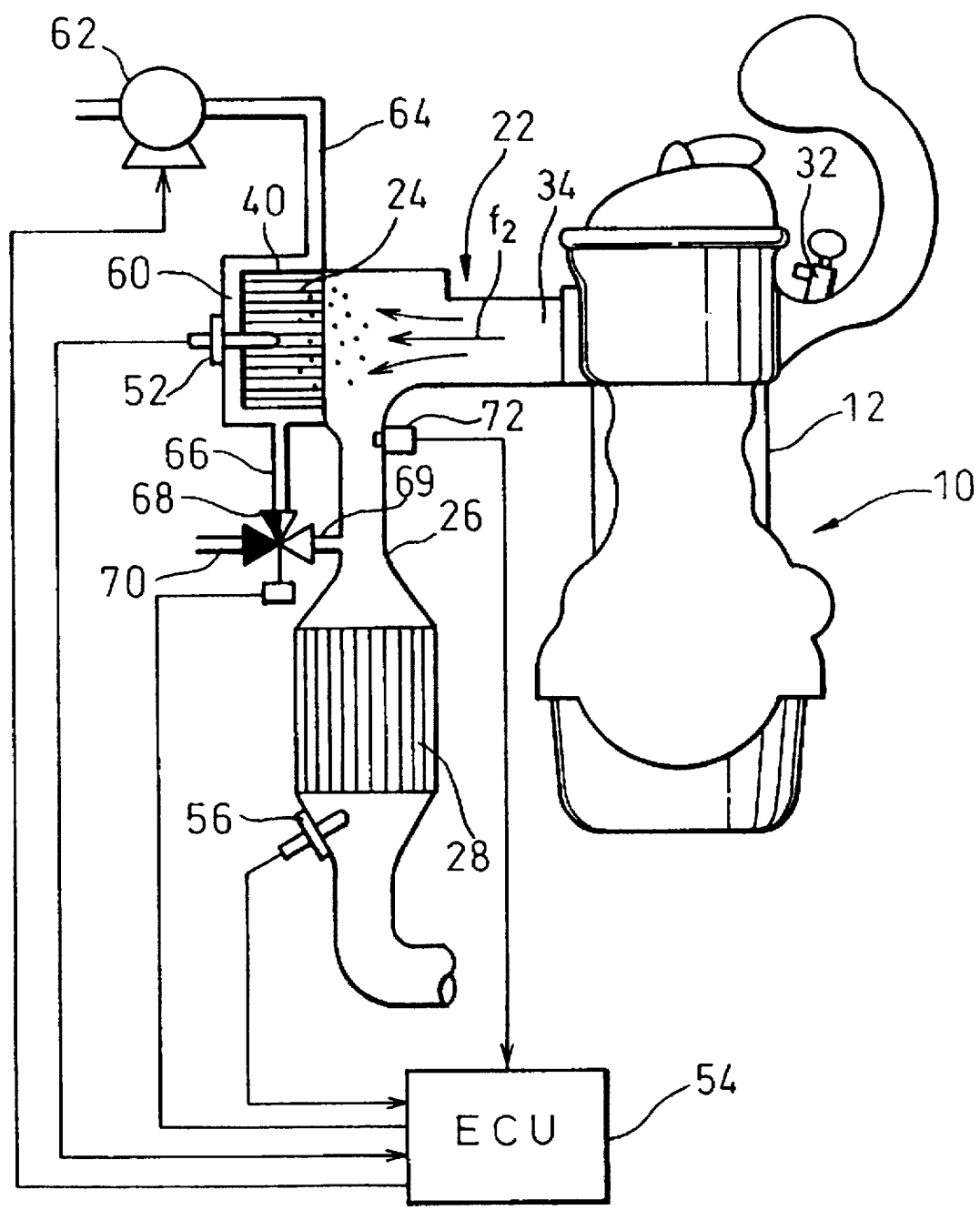
FIG. 7 is similar to FIG. 2 but illustrates a second embodiment.
Figure 8:
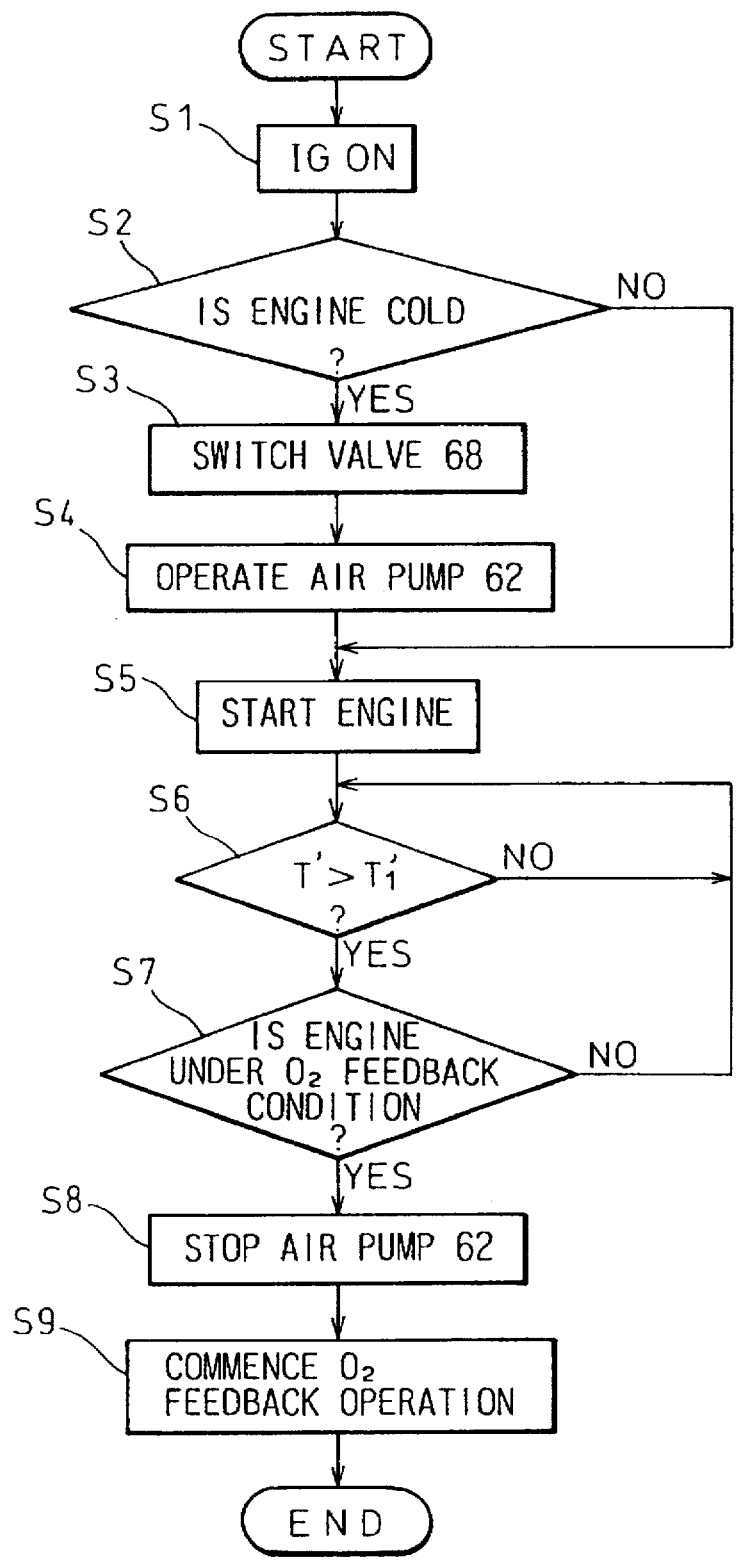
FIG. 8 is a flowchart illustrating an operation of the second embodiment during a cold start of the engine.

Now, a second embodiment of the present invention will be explained with reference to FIGS. 7 to 9. In place of the fan device 46 in the first embodiment, the second embodiment employs a construction which allows a creation of an air flow passageway at the rear side or an outer side of the adsorption device 24. Namely, as shown in FIG. 7, a chamber 60 for secondary air is provided so that it is located at the rear and outer peripheral side of the adsorption unit 24. The chamber 60 is in communication with an outlet of an air pump 62 via a passageway 64, so that a secondary air is introduced into the chamber 60. The chamber 60 is also in communication with a passageway 66, which is connected to a three port two way switching valve 68. The switching valve 68 is switched between a first position where the passageway 66 is in communication with a pipe 69 opened to the exhaust pipe 26 at a location between the adsorption unit 24 and the catalytic converter 28, and a second position where the passageway 66 is in communication with a pipe 70 opened to the atmosphere. The control circuit 54 receives signal from the sensors 52 and 56 and issues signals for operating the secondary air pump 62 and the switching valve 68.

In this embodiment, the internal combustion engine is provided with a well known system for controlling the air fuel ratio of an air fuel mixture introduced into the engine. Namely, an $O_2$ sensor 72 is arranged in the exhaust manifold 22 at a location downstream from the adsorption unit 24, so that an electric signal indicating the air fuel ratio of the air fuel mixture is generated, which is introduced into the control circuit 54. The control circuit 54 is provided with a well known feedback system for generating an electric signal for operating a fuel injector 32 for obtaining a desired amount of fuel injected from the injector, so that the air fuel ratio of the air fuel mixture introduced into the engine cylinder is controlled to a target value.

Now, an operation of the second embodiment will be explained with reference to flowcharts in FIGS. 8 and 9. In FIG. 8, the program starts when an ignition switch is mined ON (step S1). At step S2, it is determined if the engine is cold. When it is determined that the engine is cold, the routine goes to a step S3, where the valve 68 is switched to the first position so that introduction of the secondary air to the catalytic converter 28 is allowed. Then, at step S4, the secondary air pump 62 is brought into an operation, so that an air flow from the air pump 62 is, via the passageway 64 and chamber 60 adjacent to the adsorption unit 24, and introduced into the exhaust pipe 26 at a location upstream from the catalytic converter 28. In this case, the amount of the secondary air from the air pump 62 is controlled in accordance with a parameter of engine temperature, such as an enrichment correction amount of fuel injected from the fuel injection valves 32 during the cold start of the internal combustion engine. The introduction of the secondary air allows the exhaust gas to be brought into a lean condition when introduced into the catalytic converter 28, thereby promoting an oxidation reaction at the catalytic converter 28. A step S5 shows starting of the internal combustion engine.

In this state, the HC components in the exhaust gas discharged from the exhaust port 34 are, under the effect of an inertia force, moved straight forward as shown by arrows $f_2$ in FIG. 7, so as to contact the adsorption unit 24, causing the HC components to be captured thereby. On the other hand, the air flow in the secondary air passageway 60 allows a discharge of the heat from the adsorption unit 24 to be promoted, thereby preventing the temperature of the adsorption unit 24 from being quickly increased. As a result, the HC components are effectively maintained in the adsorption unit 24 until the temperature of the catalytic converter 28 is increased to the activation temperature, thereby preventing HC components from being exhausted to the atmosphere without being purified at the catalytic converter 28.

Then, at step S6, it is determined that the temperature T' of the catalytic converter 28 detected by the temperature sensor 56 is higher than a predetermined minimum temperature $T'_1$ for causing the catalytic converter 28 to be activated.

When it is determined that the temperature $T'_1$ of the catalytic converter 28 is higher than the predetermined activating temperature $T'_1$, the routine goes to step S7, where it is determined, from various engine operating parameters, such as an engine cooling water temperature, if the engine is under a condition where the above mentioned air fuel ratio control should be done. When it is determined that the engine is in the feedback condition, the routine goes to step S8, where the air pump 62 is turned OFF, and to step S9, where the air fuel ratio feedback control as above explained is commenced. Due to the stoppage of the air pump 62, the heat transmitted from the high temperature of the exhaust gas causes the temperature of the adsorption unit 24 to be gradually increased, which allows the desorption operation to release the captured HC components to commence. The released hydrocarbon components gradually flow into the exhaust pipe 26, which is subjected to the purification operation at the catalytic converter 28. The desorption of the hydrocarbon components causes the air fuel ratio to change and this is detected by the $O_2$ sensor 72. However, such a change in the air fuel ratio occurs very slowly, which allows the air fuel ratio feedback system to control the air-fuel ratio, thereby maintaining a desired air fuel ratio control operation.

Figure 9:
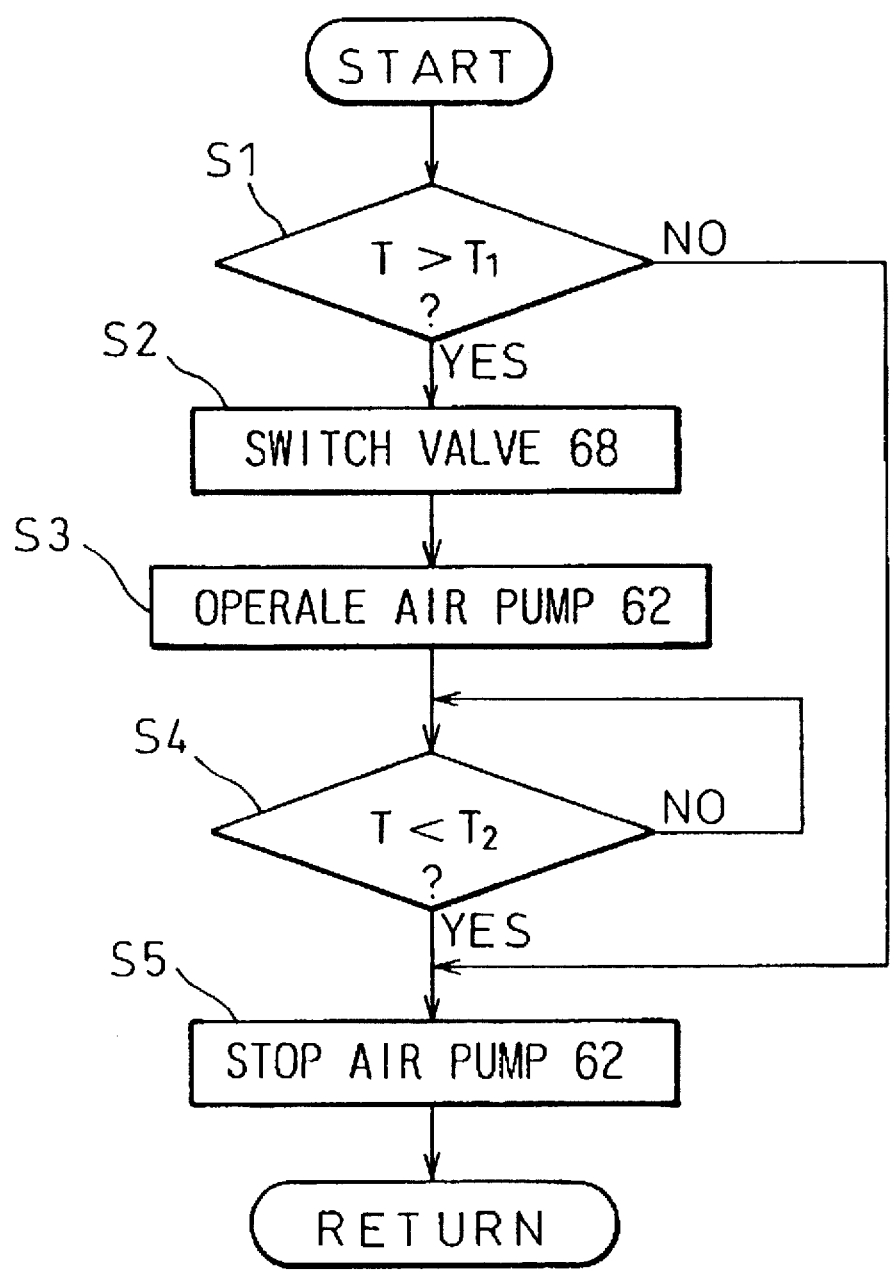
FIG. 9 is a flowchart illustrating an operation of the second embodiment during a high load condition of the engine.

FIG. 9 shows a flowchart illustrating an operation of the second embodiment when the engine is in a high load operation. At step S1, it is determined if the temperature T of the adsorption unit 24, detected by the temperature sensor 52, is higher than the predetermined value $T_1$. When it is determined that the temperature T of the adsorption unit 24 is higher than $T_1$, which is, for example, about 700° C., which may cause the micro perforation structure of the adsorption unit to be damaged, the routine goes to step S2, where the switching valve 68 is switched to the second position where the chamber 60 is connected to the atmosphere via the passageway 66 and pipe 70, and goes to a step S3, where the air pump 62 is turned ON. As a result, an air flow through the chamber 60 is caused, thereby cooling the HC adsorption material.

At step S4, it is determined if the temperature T of the adsorption material is lower than a predetermined value $T_1$ which is lower than $T_1$ and is, for example, about 600° C. When it is determined that the temperature of the adsorption unit 24 is lower than $T_2$, the routine goes to a step S5, where the air pump 62 is made OFF. As in the first embodiment, the difference between the values $T_1$ and $T_2$ is determined such that a desired hysteresis characteristic is obtained.

In this embodiment, the cooling of the adsorption unit 24 during the cold start operation of the internal combustion engine allows the speed of the increase in the temperature of the hydrocarbon adsorption unit 24 to be reduced, thereby increasing an adsorption efficiency. Furthermore, the cooling of the adsorption unit 24 during a high-load operation can prevent the micro perforation structure of the HC adsorption material from being damaged. Furthermore, in a well known manner, the amount of the secondary air for cooling the HC adsorption unit introduced into the exhaust system at a location upstream from the catalytic converter 28 can be controlled to obtain a desired air fuel ratio of the exhaust gas, thereby improving the exhaust gas purifying function by the catalytic converter 28. Furthermore, cooling fins similar to those (40-1) in FIG. 2 can be arranged on the inner wall of the secondary air passageway or chamber 60, thereby increasing the cooling capacity of the adsorption unit 24 by means of the secondary air flow in this embodiment.

Figure 10:
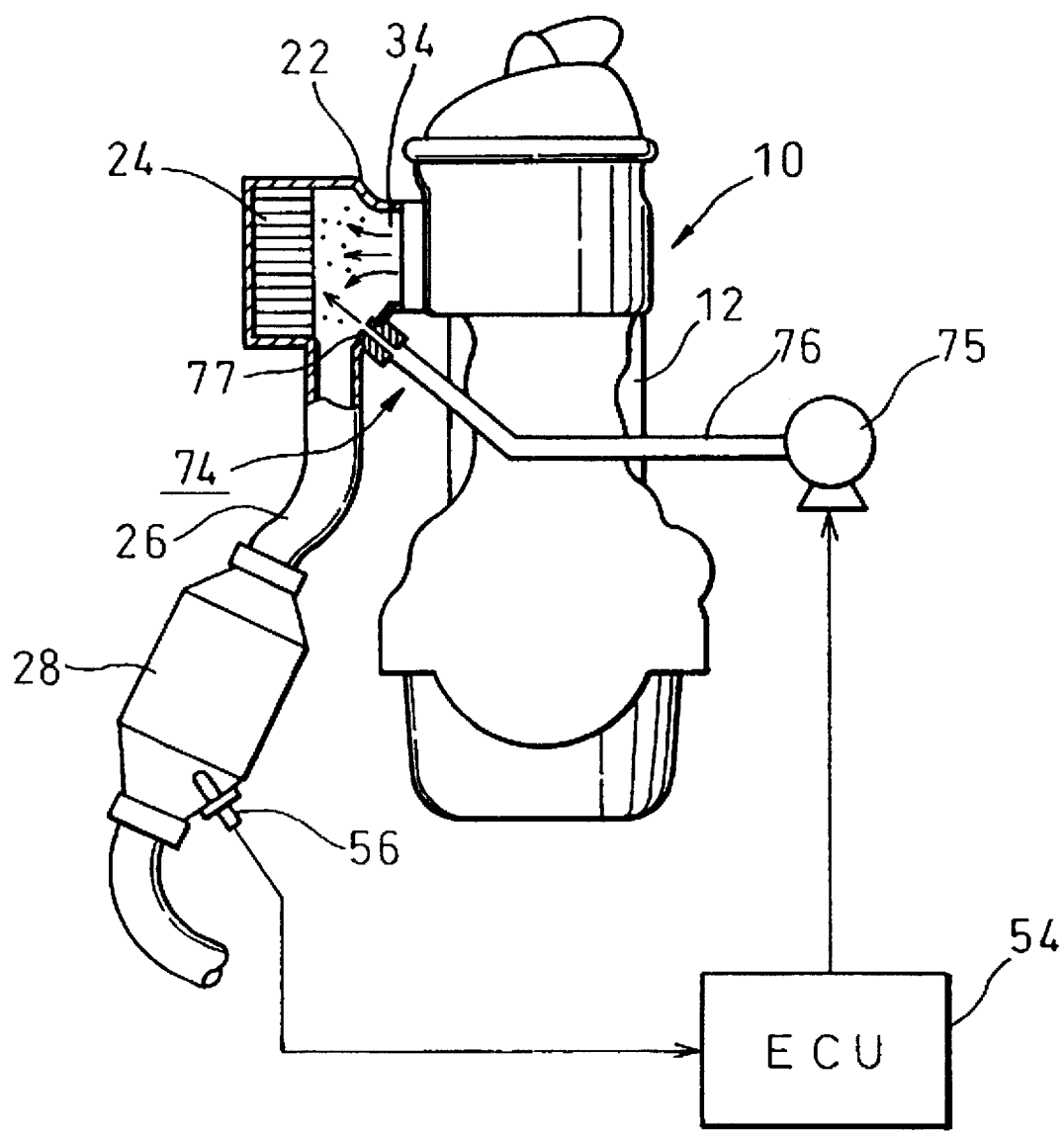
FIG. 10 is similar to FIG. 2 but illustrates a third embodiment.
Figure 11:
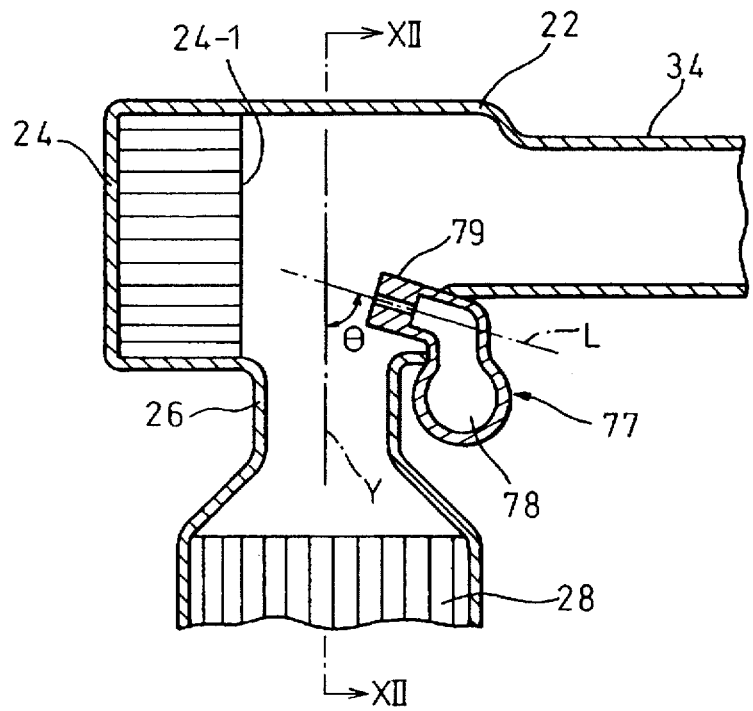
FIG. 11 is an enlarged view of a part of a adsorption unit in FIG. 10.
Figure 12:
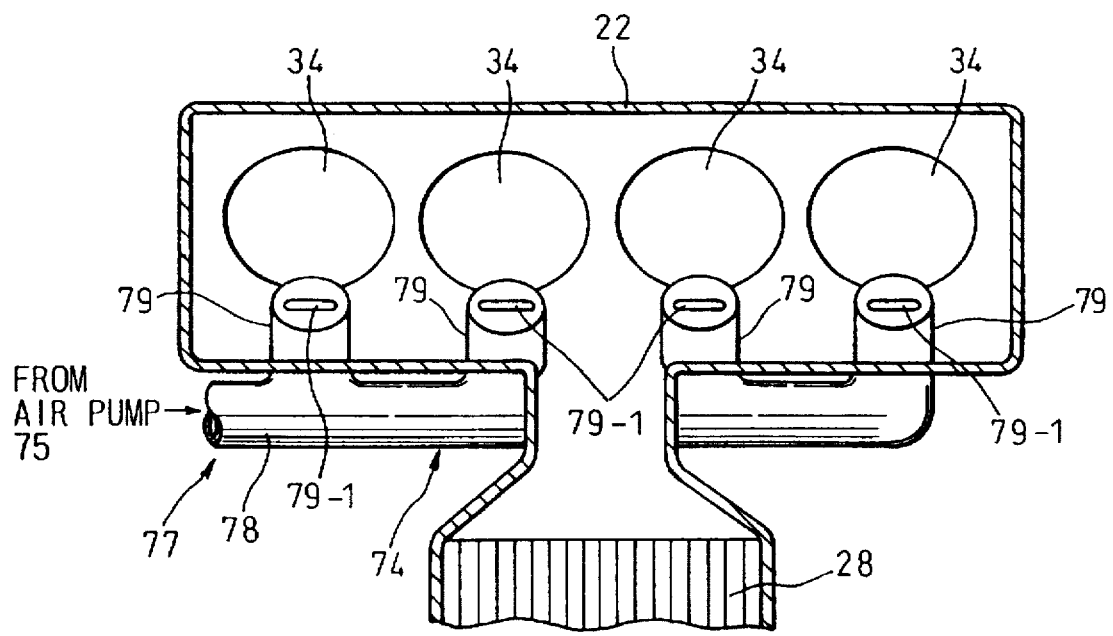
FIG. 12 is a cross sectional view taken along line XII—XII in FIG. 11.

FIG. 10 shows a third embodiment according to the present invention. In this embodiment, an air injecting device 74 is provided for obtaining a secondary air flow introduced into the exhaust manifold 22 at a location adjacent the adsorption unit 24. Namely, the injecting device 74 includes an air pump 75, an air injection pipe 76 connected to the air pump 75 for receiving an air flow from the air pump 75, and an air injection manifold 77 connected to the pipe 76. As shown in FIG. 11, the air injection manifold 77 includes a distributing pipe 78 receiving the air as supplied from the pipe 76 and a plurality of nozzles 79, which are arranged adjacent to the exhaust ports 34 of the respective cylinders 30, so that the nozzles 79 face the corresponding adsorption units 24 at their front end surfaces 24-1 as shown in FIG. 11. As shown in FIG. 12, each of the nozzles 79 is formed with outlet opening 79-1 which has an axis $L_1$, which is inclined to a vertical axis Y at an angle $\theta$ and has a lateral cross-section in the shape of a slit, which extends in the direction that the cylinders 34 line up as shown in FIG. 12. As shown in FIG. 10, the air pump 75 is electrically connected to the control circuit 54, so that an electrical control signal from the control circuit 54 is supplied to the air pump 75. The remaining construction is the same as that in any of the preceding embodiments, and, therefore, a detailed explanation thereof is eliminated.

Figure 13:
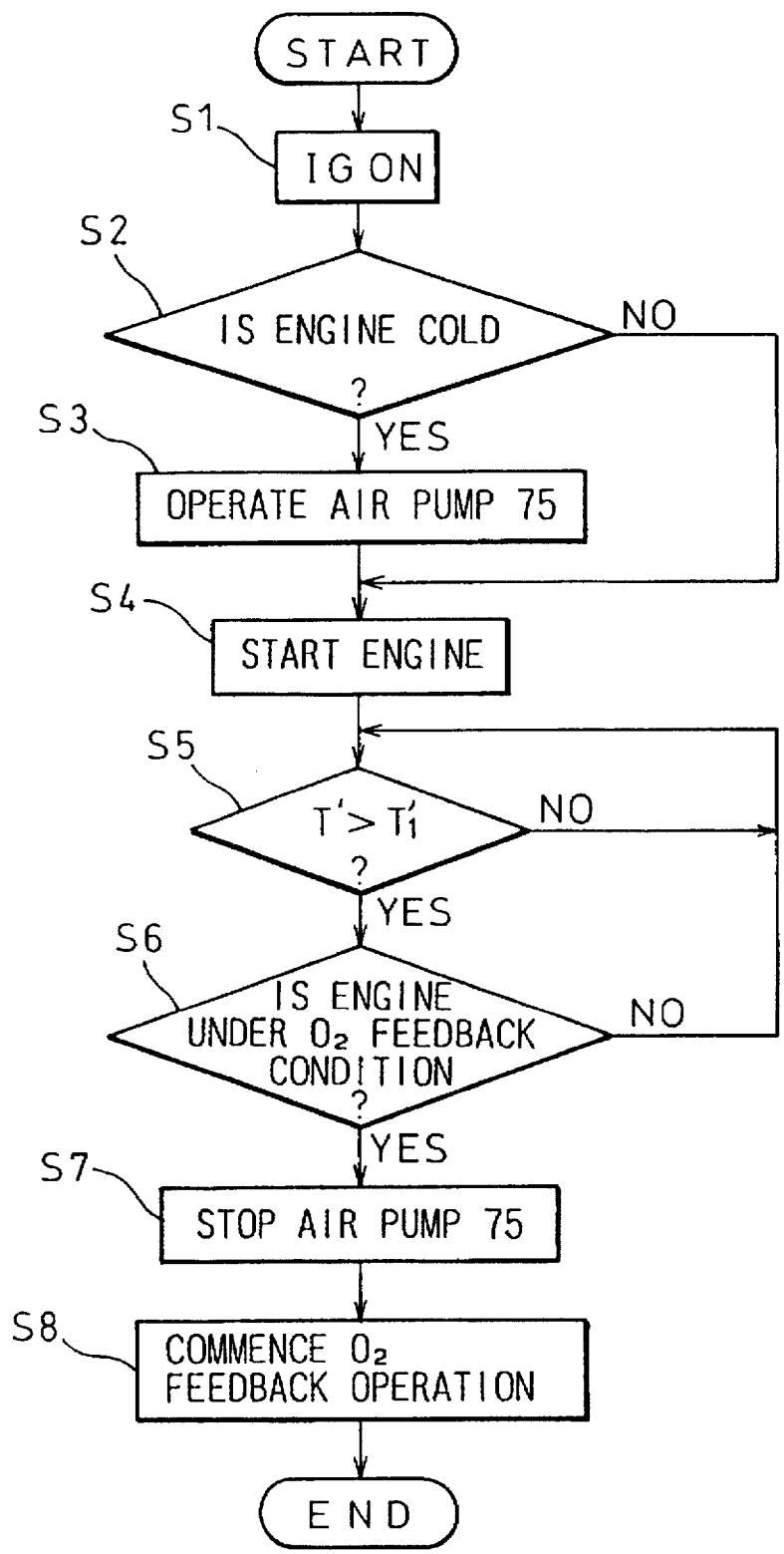
FIG. 13 is a flowchart illustrating an operation of the third embodiment.

Details of the operation of the third embodiment will be explained with reference to a flowchart in FIG. 13. After the ignition switch is turned ON at step S1, it is determined if the internal combustion engine to be started is cold at step S2. When it is determined that the engine is cold, the routine goes to step S3, where the air pump 75 is turned ON in such a manner that an amount of the secondary air discharged into the air injection pipe 76 is obtained and that the amount is varied in accordance with a cold start enrichment correction amount of injected fuel, which is, in a well known manner, determined in accordance with the temperature of the engine cooling water. The air from the pipe 76 is injected to the exhaust manifold 22 via the respective nozzles 79 so that it is directed toward the front end surfaces 24-1 of the respective adsorption unit 24. The engine is then started (step S4).

Figure 14A:
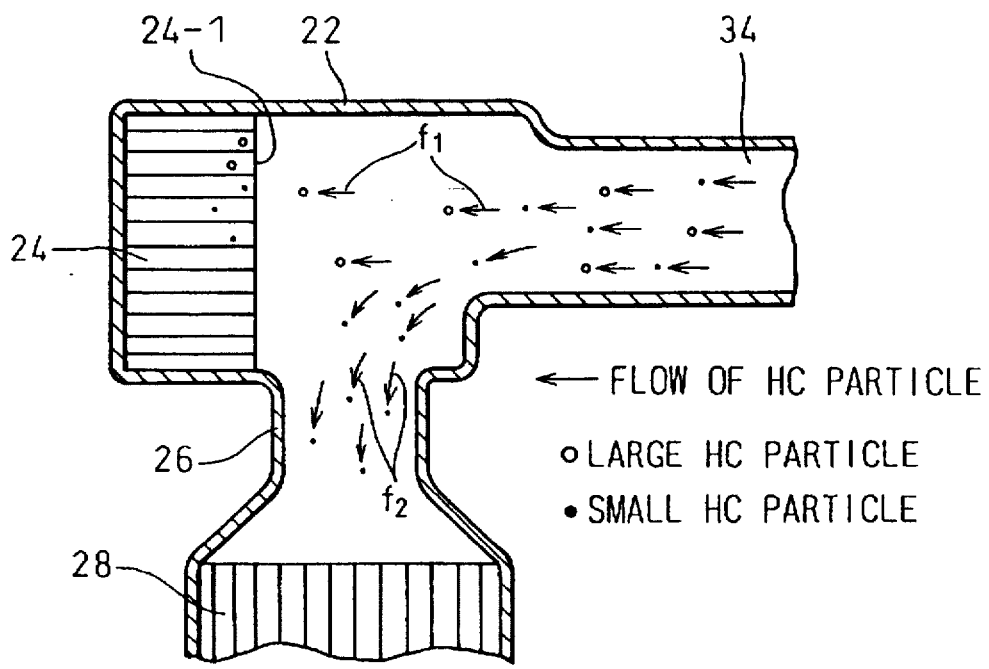
FIG. 14A is similar to FIG. 11 but illustrating an operation of a prior art.
Figure 14B:
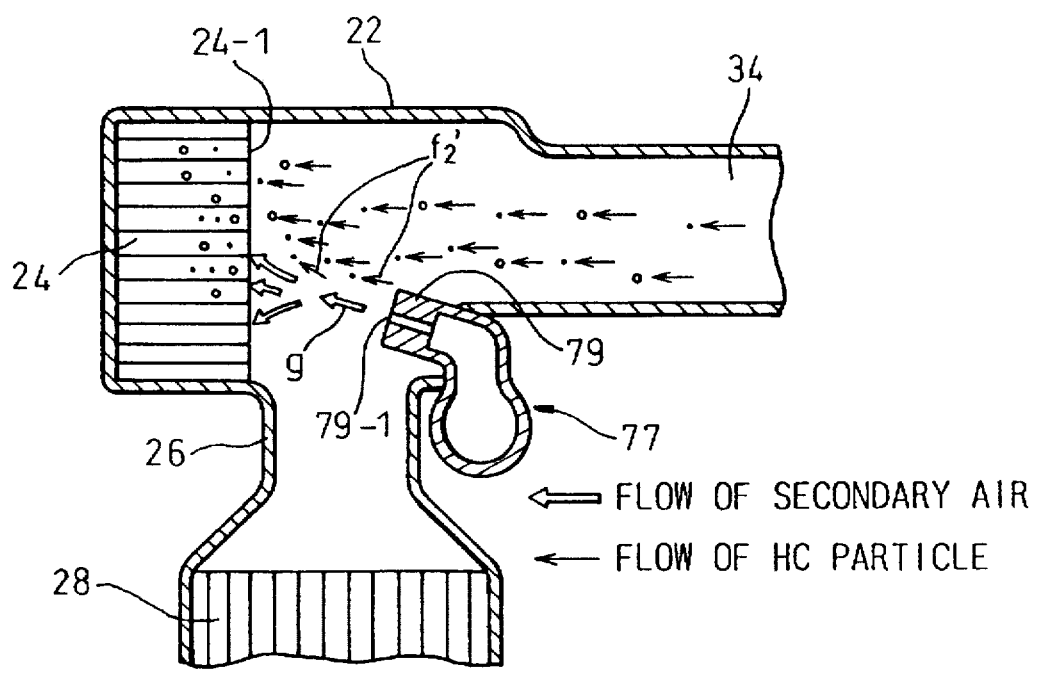
FIG. 14B is the same as FIG. 11 but illustrating an operation of the third embodiment.

During a cold start of the internal combustion engine, a majority of HC particles in the exhaust gas discharged from the exhaust ports 34 are the ones having large diameter. Such large particles from the exhaust ports 34, as shown in FIG. 14A, mostly flow along a straight line toward the corresponding adsorption unit 24 as shown by arrows $f_1$ due to the effect of inertia. If no provision is made as to the secondary air injection means in the third embodiment, the remaining small or lightweight HC particles are entrained by the flow of the exhaust gas and flow along the curved line of the exhaust pipe as shown by arrows $f_2$, which causes the HC component to be discharged into the atmosphere without being captured by the adsorption unit 24, thereby causing the exhaust gas purification performance to be reduced. The provision of the secondary air injection means in the third embodiment can overcome this difficulty. Namely, FIG. 14B is similar to FIG. 14A, but shows an arrangement in the third embodiment. In the construction of the third embodiment in FIG. 14B, the secondary air is injected from the nozzles 79 toward the inlet surfaces 24-1 of the corresponding adsorption units 24 as shown by arrows g. The HC components with relatively small particle sizes are thus entrained by the flows of secondary air from the nozzles 79, so that the directions of the particles are modified to flow toward the adsorption units 24 as shown by arrows $f_2'$. As a result, the HC components with relatively small particle sizes contact and are captured by the adsorption units 24, thereby obtaining an increased adsorption capacity. Due to the introduction of the secondary air, which is continued after the complete combustion state is obtained, a cooling effect of the adsorption units 24 is obtained, thereby preventing the temperature of the adsorption units 24 from being quickly increased. As a result, the captured HC component, which would otherwise be prematurely discharged to the atmosphere without being purified can be effectively held in the adsorption units 24.

Returning to FIG. 13, at step S5, it is determined if the temperature T' of the catalytic converter 28 detected by the temperature sensor 56 is higher than a predetermined activated temperature $T'_1$. When a determination that the temperature T' of the catalytic converter 28 is higher than the activated temperature $T'_1$, the routine goes to step S6, where it is determined whether a condition exists in which the engine is under a feedback control of the air-fuel ratio based on an air fuel ratio signal from the $O_2$ sensor 56. In other words, the introduction of the secondary air from the injection nozzles 79 is executed when the air-fuel ratio feedback control condition is not executed due to the non-activated condition of the catalytic converter 24. When a determination that the engine is under the condition that the air-fuel ratio feedback control should be executed, the routine goes to a step S7, where the air pump 75 is turned OFF for stopping the introduction of the secondary air into the exhaust system. Then, at step S8, the air-fuel ratio feedback control is commenced.

Figure 15:
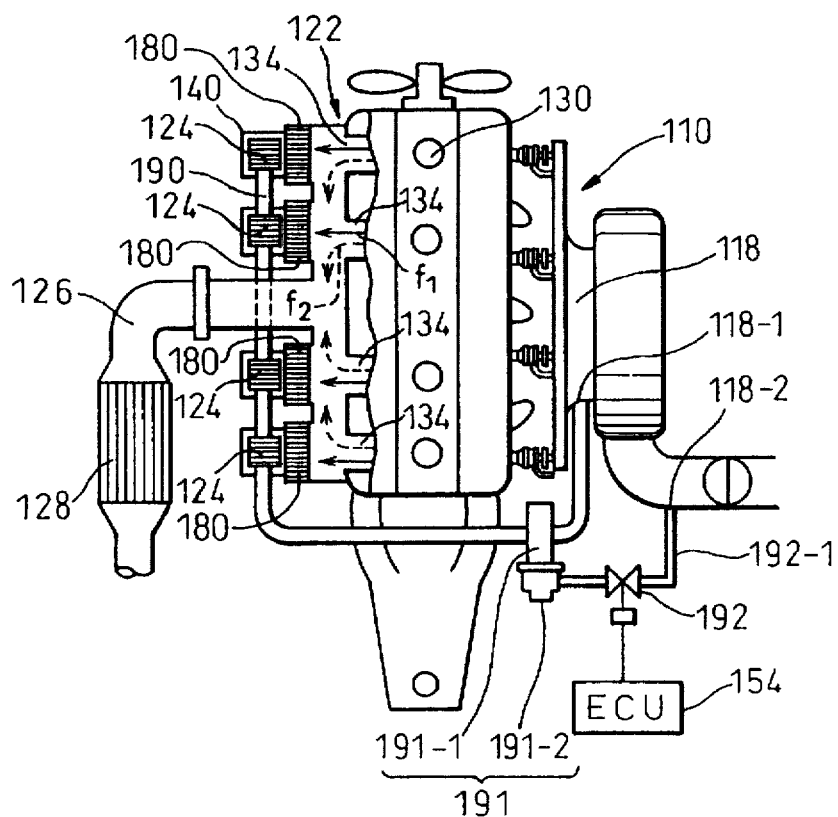
FIG. 15 is similar to FIG. 1 but illustrates a fourth embodiment.
Figure 16:
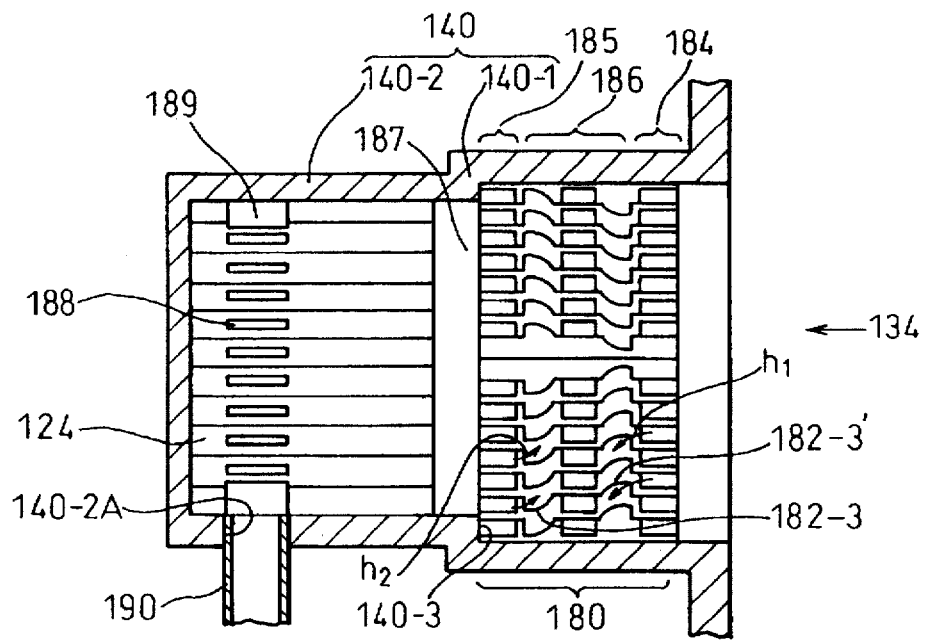
FIG. 16 is an enlarged partial view of FIG. 15, illustrating a detail of a adsorption unit.
Figure 17:
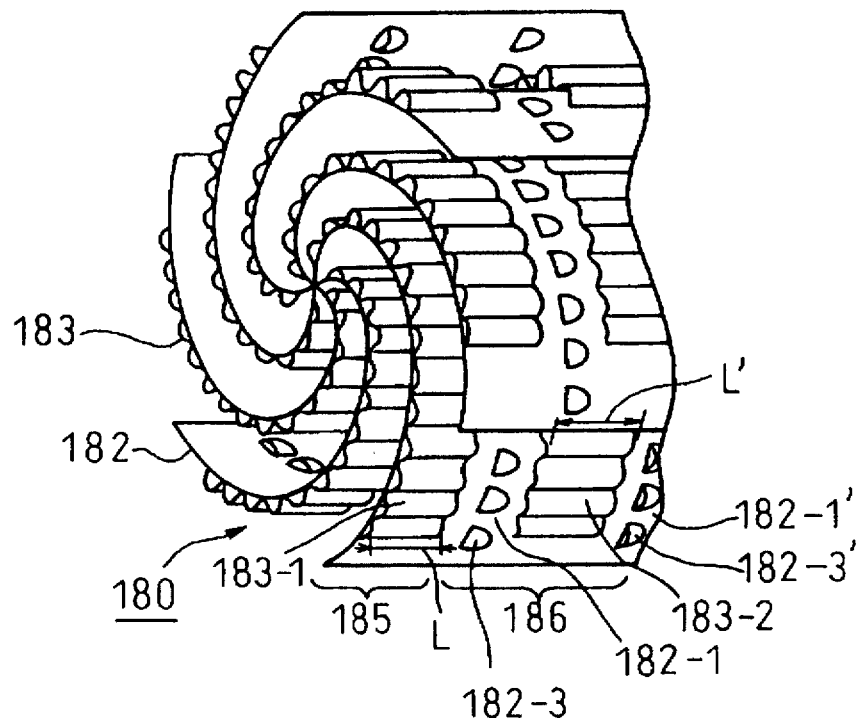
FIG. 17 is an exploded view of a honeycomb structure in the adsorption unit in FIG.16.

FIG. 15 generally shows a fourth embodiment, wherein, as in the previous embodiments, an exhaust manifold 122 is formed with casing portions 140 which face the corresponding exhaust ports 134 of the internal combustion engine, so that adsorption units 124 are stored in the casing portions 140. In FIG. 16, showing a detail of the adsorption unit 124 in this embodiment, the casing 140 is formed as a cup, with a closed bottom and a stepped inner opening, in which the HC adsorption unit 124 is stored. Namely, the casing 140 is constructed by a first tubular portion 140-1 of a larger diameter and 140-2 of a smaller diameter. In this embodiment, the HC adsorption unit 124 is constructed by a carrier, in a form of a honeycomb structure constructed by metal foils or ceramic material such as an alumina, and an adsorbent, such as a zeolite, which is coated on the carrier. Arranged in the casing 140 on one side of the HC adsorption unit 124 adjacent the exhaust port is a heat discharging unit 180. As shown in FIG. 17, the heat discharging unit 180 is, also, formed as a carrier in a form of a honeycomb structure, which is, for example, constructed by a first layer 182 formed as thin flat plates and a second layer 183 formed as corrugated plates. These first and second layers 182 and 183 extend in a spiral direction. Namely, FIG. 17 shows a condition of the first and second layers 182 and 183 before they are rolled. The first (flat) and second (corrugated) layers 182 and 183 are, first, connected with each other at their inner ends and are rolled so that the plates 180-1 and 180-2 extend along spiral directions. A roll shaped body thus obtained is press fitted to the large diameter portion 140-1 until the roll shaped body is engaged with a shoulder portion 140-3 formed between the large diameter portion 140-1 and the small diameter portion 140-2, of the casing 140. Such a press fitted engagement of the honeycomb body to the casing 140 is effective for obtaining a thermal contact between the casing 140 and the honeycomb structure, thereby increasing a heat discharging capacity to the atmosphere.

As shown in FIG. 16, the heat discharging unit 180 is, along its length, divided into a first or outer portion 184, a second or inner portion 185 and an intermediate or diffusing portion 186. A catalyst such as platinum or palladium is carried by the outer and inner portions 184 and 185 of the heat discharging unit 180. Such a catalyst in the outer and inner portions 184 and 185 is effective for obtaining a preliminary operation for purifying HC components which are released from the desorption unit 124. Such a preliminary purifying operation occurs prior to the main purification operation at the catalytic converter 28 which is located downstream from the adsorption units 124. Namely, as in the first embodiment, during a cold condition of the engine, the HC component is caught by the adsorption unit 124. When the engine is warmed up, the HC components held by the adsorption unit 124 are subjected to a desorption operation and the resultant released HC components are entrained by the flow of the exhaust gas. When the released HC components pass the heat discharging unit 180, the catalyst in the first and second parts 185 function to preliminarily purify the HC component prior to the execution of the main purification operation at the catalytic converter 28.

As shown in FIG. 17, at the second or inner part 185 of the heat discharging unit 180, each of the corrugated layers 183 is constructed by a corrugated plate 183-1 which extend along the entire length of the layer, which corresponds to a circumferential direction after being rolled into the honeycomb structure, while the corrugated plate 183-1 extends along the axis of the roll along a predetermined length L. The first or outer section 184 has, while not shown in FIG. 17, a structure which is similar to the structure of the second or inner section 185.

Figure 18:
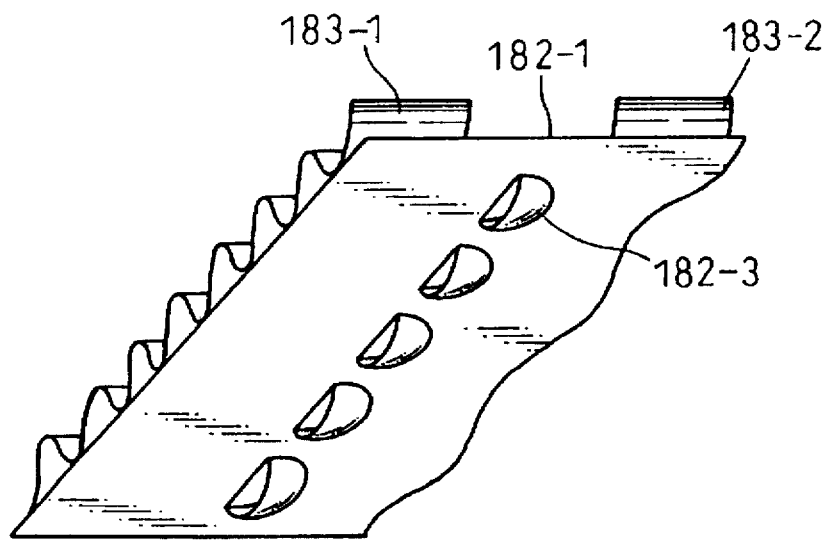
FIG. 18 is a schematic perspective view of a layer in the honeycomb structure in FIG. 17.

In the heat discharging unit 180, the third or intermediate portion 186 between the outer portion 184 and the inner portion 185 functions to discharge the flow of the exhaust gas in a radially outward direction. Namely, as shown in FIGS. 17 and 18, at the intermediate portion 186, each of the second layers 183 includes a corrugated plate 183-2 of an axial length L', which provides portions 182-1 and 182-1' of the flat layer 182 with no corrugated plate, which portions 182-1 and 182-1' extend along the entire spiral direction. Furthermore, at the portions 182-1 and 182-1' with no corrugated plate, the flat plate 182 is formed with raised portions 182-3 and 182-3'. In order to obtain these portions 182-3 and 182-3', slits which are spaced in a length of the flat plate 182 or in a spiral direction after being rolled and portions adjacent the slits, are depressed. As shown in FIG. 16, the raised portions 182-3, which are thus formed, are opened in the axial direction toward the adsorption unit 124, while the raised portions 182-3' are opened inwardly toward the adsorption unit 124, while the raised portions 182-3' are opened outwardly toward the corresponding exhaust port 134. As a result, the raised portions 182-3 and 182-3' function to change the direction of the flow of the exhaust gas and the direction of the flow of the released HC gas from the adsorption unit, introduced into the heat discharge section 180. Namely, the direction of the flow of the exhaust gas introduced into the raised portions 182-3' from the inlet part 184 is changed so that the flow is directed radially outwardly as shown by arrows $h_1$ in FIG. 16. As a result, a uniform distribution of the speed of the gas directed to the adsorption unit 124 is obtained. Contrary to this, the direction of the released HC component from the adsorption unit 124 is changed so that the flow is directed radially inwardly as shown by arrows $h_2$ in FIG. 16. As a result, a locally increased concentration of the released HC gas components is obtained at the radially inward part of the heat discharge device 180.

As shown in FIG. 16, between the HC adsorption unit 124 and the heat discharging device 180, a space is left, so that a heat discharging chamber 187 is formed between the casing 140, the HC adsorption device 124 and the heat discharging device 180. As a result, the heat of the exhaust gas at the chamber 187 is discharged to the atmosphere, so that, prior to the introduction into the adsorption unit, a further reduction in the temperature of the exhaust gas occurs. It should be noted that the provision of the shoulder portion 140-3 allows the first heat discharging unit 180 to be located at a fixed axial position, thereby obtaining a fixed length of the chamber 187 (second heat discharging means). In place of the chamber 187, a honeycomb structure similar to the unit 180 can be employed while carrying no catalyst nor adsorbent for hydrocarbon.

In this embodiment, the HC adsorption device 124 has a similar honeycomb structure as that in any of preceding embodiments, except that the adsorption device 124 is provided with slits 188 which are formed at respective layers of the honeycomb structure, so that these slits 188 are in communication with each other, thereby allowing the exhaust gas to flow radially. Furthermore, the HC adsorption device is formed with an opening 189 at the outermost layer, which is in communication with a pipe 190, which is connected to the portion 140-2 of the casing 140. Namely, the portion 140-2 has at its cylindrical wall an opening 140-2A to which an end of the pipe 190 is fitted. As shown in FIG. 15, the pipe 190 connects, in series, the openings 189 of the casing 140 of the respective cylinders with each other. The pipe 190 has an upstream end which is connected to a vacuum taking-out port 118-1 in intake manifold 118, so that an exhaust gas recirculation (EGR) passageway for recirculating the exhaust gas from the exhaust manifold 122, via the adsorption units 124, to the intake manifold is created. An exhaust gas recirculation (EGR) valve 191 is arranged on the exhaust gas recirculation pipe 190. The EGR valve 191 is of a vacuum actuated type having a valve body 190-1 and a vacuum actuator 190-2 for operating the valve body 190-1. A switching valve 192 is located on a vacuum pipe 192-1 between a vacuum port 118-2 in the intake manifold 118 and the vacuum actuator 191-2. A control circuit 154 issues electrical signals for controlling the switching valve 192.

Figure 19:
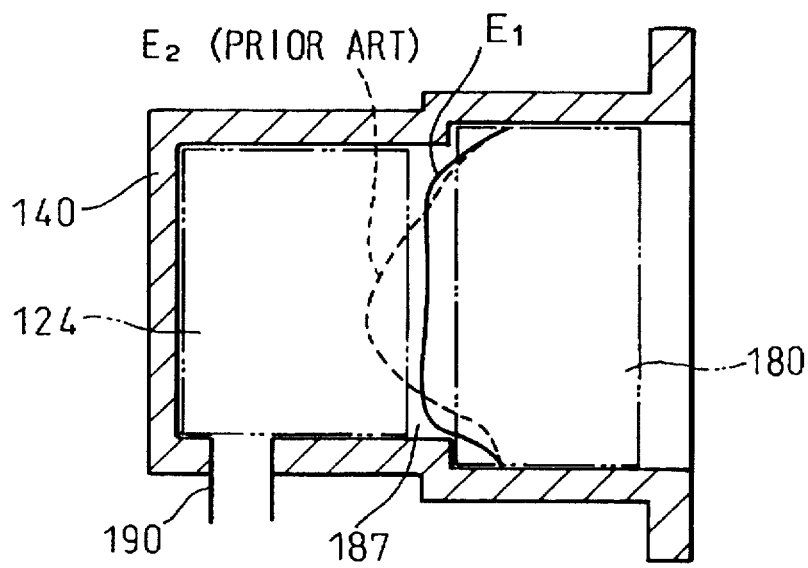
FIG. 19 is a longitudinal cross sectional view of the adsorption unit in FIG. 15, illustrating a temperature distribution therein.

In the above construction, starting an engine which is cold causes an exhaust gas which includes a large mount of HC to be generated. The exhaust gas from the exhaust ports 134 flows along straight lines to the respective heat discharging units 180, whereat the flow direction of the exhaust gas is partly changed as shown by an arrow $h_1$ so as to be directed radially outwardly due to the provision of the raised portions 182-3' at a location upstream from the diffusion portion 186 of the heat discharging unit 180. The exhaust gas is subjected to a change in a flow direction due to the effect of inertia. At the raised portions 182-3, the flow direction of the exhaust gas is, again, partly changed so as to be directed radially outwardly. Due to the provision of the raised portions 182-3' and 182-3, a uniform distribution of the HC components in the exhaust gas is obtained as shown by a solid line E1 in FIG. 19 prior to the introduction of the exhaust gas to the adsorption unit 124. As a result, the entire cross sectional area of the adsorption unit can be effectively used for executing an HC adsorption operation. In FIG. 19, a dotted line E2 shows a distribution of the HC component in the prior art, where no provision is made as to means for changing the direction of the flow. In this case, the HC component is locally concentrated at its middle portion in the cross section, which makes it difficult to effectively use all of the area for adsorption of HC components.

In this fourth embodiment, the exhaust gas is subjected to cooling when passed through the heat discharging unit 180. A cooling operation is also obtained when the exhaust gas flows through the chamber 187 between the heat discharging unit 180 and the adsorption unit 124. Due to the cooling of the exhaust gas at the heat discharging unit 180 as well as the cooling chamber 187, the HC components can maintain their increased size state prior to the introduction into the adsorption unit 124, thereby increasing the HC adsorption capacity.

In the construction of the fourth embodiment, the adsorption units 124, which are independently provided for the respective cylinders 130, are in a series connection with each other by means of the communication pipe 190. When a cylinder 130 is in an exhaust period in the combustion cycle of the four cycle internal combustion engine, the pressure at an exhaust port 134 of the instant cylinder 130 becomes high. In other words, the pressure at the corresponding adsorption unit 124 of the corresponding cylinder is higher than the pressures at the adsorption units 124 of the remaining three cylinders 130. The mutual communication by means of the pipe 190 thus allows the exhaust gas at the instant adsorption unit 124 to flow into an adjacent adsorption unit, which allows newly discharged exhaust gas to flow into the instant adsorption unit 124 from the corresponding exhaust port 134. As a result, a relatively increased amount of exhaust gas flowing into the adsorption unit is obtained. Furthermore, due to the mutual flow of the exhaust gas between the adsorption units 124, a pressure wave generated by a pulsation of the exhaust gas is prevented from being reflected at a closed end, which would otherwise occur. As a result, an effective adsorption capacity at the HC adsorption unit is realized.

Figure 20:
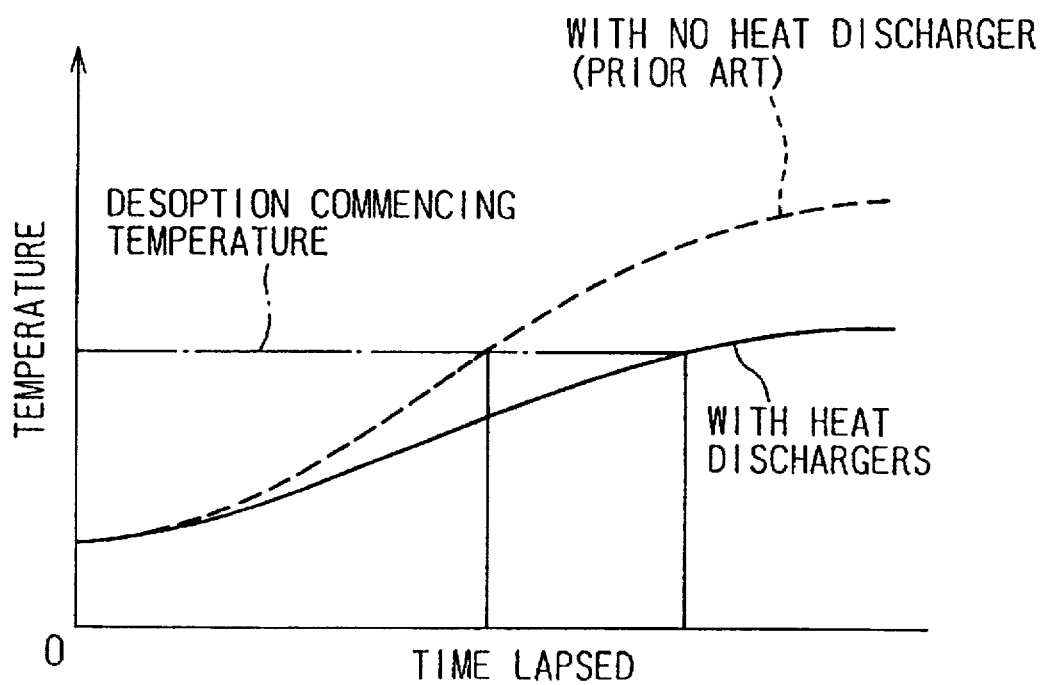
FIG. 20 is graphs showing relationship between the lapsed time and the temperature of the adsorption layer in the adsorption unit.

After the completion of the starting of the engine, the temperature of the exhaust gas as directed to the HC adsorption layer in the adsorption unit 124 is increased. However, due to the existence of the first and second heat discharging units 180 and 187, the rate of increase of the temperature of the HC adsorption unit 124 is slowed down, which causes the commencement of desorption of the HC components at the unit 124 to be correspondingly delayed. Namely, in FIG. 20 a solid line shows the speed of an increase of the temperature when the heat discharging unit is provided in accordance with the embodiment, while a dotted line shows the characteristic without the provision of such a unit. According to the present invention, a delay is obtained in an increase in the temperature of the desorption unit 124 to a predetermined temperature (a desorption commencement temperature) where desorption of the captured HC gas commences. During such a delay of desorption of the HC components, the temperature of the three way catalytic converter 128 can be increased to the activating temperature. Furthermore, the provision of the heat discharging units 180 and 187 can discharge heat even at a-high rotational or high load condition of the engine, thereby preventing the temperature of the HC adsorption layer from being excessively increased.

When the temperature of the HC adsorption layer is increased to the predetermined value, desorption of the HC components captured by the HC adsorption unit 24 commences. The captured HC components are entrained in the flows of exhaust gas and flow toward the three way catalytic converter 128 as shown by dotted arrows $f_2$ in FIG. 15. In this case, a temperature increase in the catalyst layers 184 and 185 at the first heat discharging unit 180 is faster than that at the catalytic converter 128. As a result, even in a case of premature desorption of the HC components at the HC adsorption unit 124, the released HC components are effectively purified at the catalyst layers 184 and 185. Furthermore, the raised portions 182-3, upstream from the diffusion layer in the flow of the captured HC components, guide the flows so as to be directed to a radially inward portion of the honeycomb structure as shown by the arrow $h_2$ in FIG. 16, where the temperature is relatively high, thereby obtaining an effective purification of the HC components as released from the HC adsorption unit.

When a fully warmed-up condition of the engine is obtained, an exhaust gas recirculation operation is allowed. In this case, the control circuit 154 issues a signal directed to the switching valve 192, which allows an intake vacuum at the port 118-2 to be opened to the actuator 191-2, thereby causing the EGR valve 191-1 to be opened. As a result, a recirculated exhaust gas flows from the exhaust manifold 122 to the intake manifold 118 via the pipe 190. Such a recirculated flow of exhaust gas allows the adsorption units 124 at the respective cylinders 130 to be heated up, thereby causing the captured HC components to be subjected to a desorption operation to release HC gas. The released HC gases from the unit 124 are entrained in the flow of the recirculated gas and are introduced into the intake manifold 118, thereby causing the HC gas to be burnt in the combustion chambers in the engine 110.

During the engine high-load condition, the temperature of the exhaust gas is highly increased. However, during the high load condition, the control circuit 154 issues a signal for causing the switching valve 192 to be closed, so that the actuator 191-2 is isolated from the vacuum source, thereby closing the EGR valve 191-1. As a result of the stoppage of the recirculation of the exhaust gas, the adsorption units 124 are prevented from being overheated. It should be noted that the exhaust gas recirculation operation is also stopped when the engine is started, so that the HC components in the exhaust gas generated during the start up condition of the engine are effectively and temporarily held by the adsorption units 124.

Figure 21:
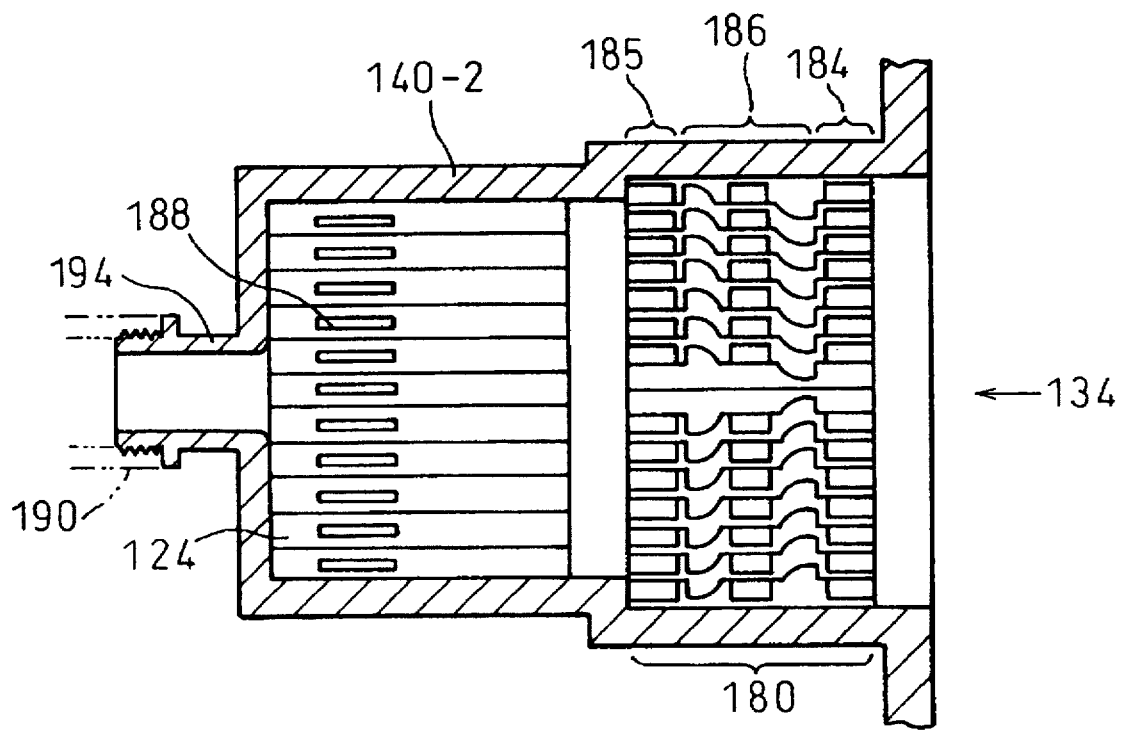
FIG. 21 is similar to FIG. 16 but illustrates a fifth embodiment.

FIG. 21 shows a fifth embodiment of the present invention, where, in place of the opening 140-2A in FIG. 16, the tubular portion 140-2 has, at its axial end wall, a union portion 194 with a screw thread, to which the pipe 190 is connected so that the adsorption units 124, which are located adjacent with each other, are connected as explained with reference to the fourth embodiment in FIG. 16. This embodiment is advantageous in that a deeper introduction of the exhaust gas from the corresponding exhaust port 134 becomes possible, thereby enhancing a capacity for adsorption of HC components in the exhaust gas. Furthermore, the union 194 with the screw thread allows the pipe 190 to be easily connected. Furthermore, the gap 189 in the embodiment in FIG. 16 can be eliminated, which makes the corresponding machining unnecessary, thereby enhancing productivity and lowering manufacturing cost.

Figure 22:
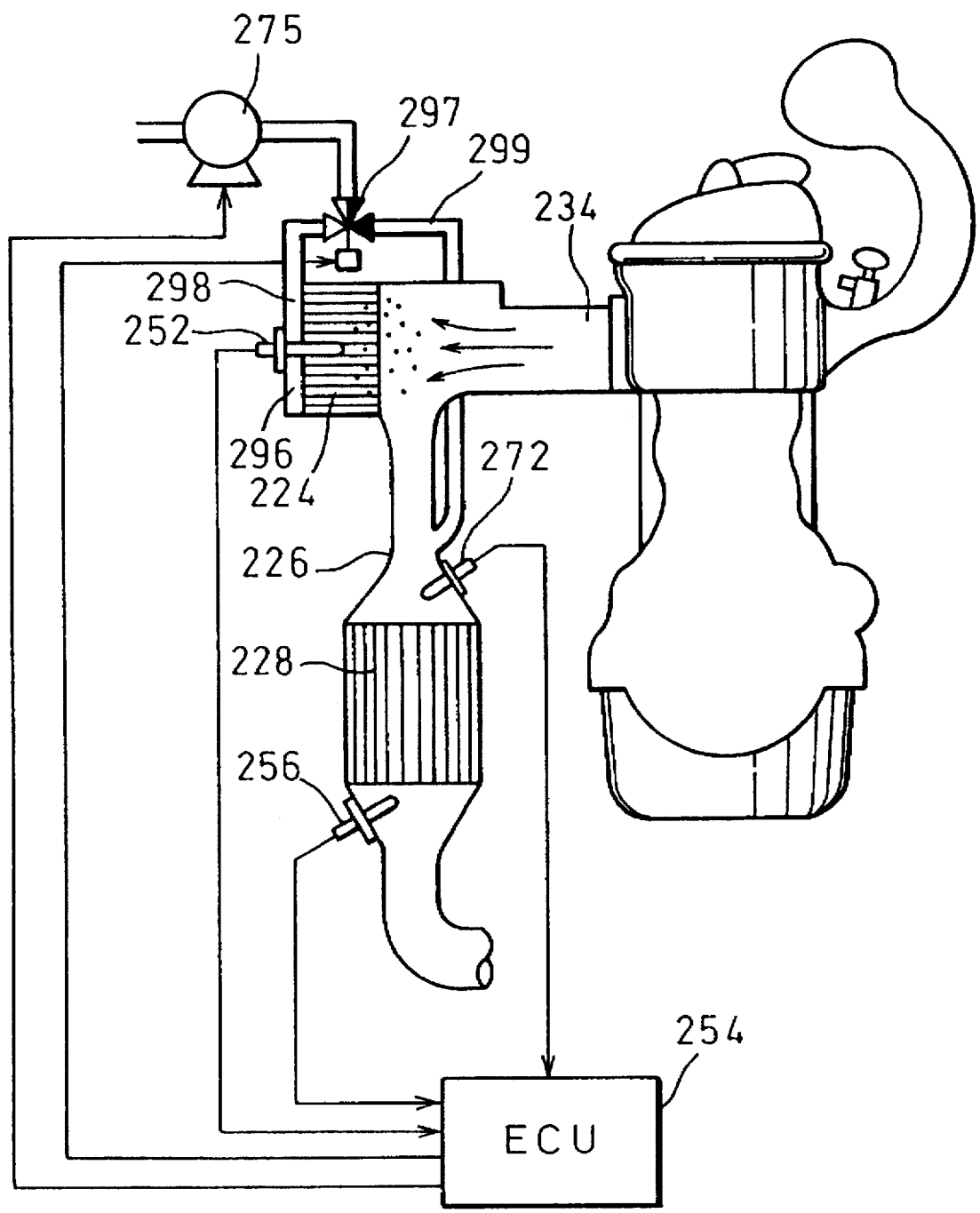
FIG. 22 is similar to FIG. 2, but illustrates a sixth embodiment.

FIG. 22 shows a sixth embodiment which is similar to the embodiment in FIG. 15 in that a flow is generated through a unit for adsorption of HC components held thereby. However, in this embodiment, a flow of secondary air is used in place of a flow of recirculated exhaust gas. Namely, in FIG. 22, on one side of an adsorption unit 224, a chamber 296 is formed. A switching valve 297 is provided which is switched between a position where a secondary air pump 275 is in communication with the chamber 296 via a pipe 298 and a position where the air pump 275 is in communication with an exhaust pipe 226, at a location between the HC adsorption unit 224 and a catalytic converter 228, via a pipe 299. In this embodiment, the adsorption unit 224 has axially opposite open ends, one of which is opened to the corresponding exhaust port 234, while the other end of the adsorption unit 224 is opened to the chamber 296. A control circuit 254 is also provided for controlling the air pump 275 and the switching valve 297. Furthermore, an $O_2$ sensor 272, a sensor 252 for detecting a temperature of the adsorption unit 224, and a sensor 256 for detecting the temperature of the exhaust gas are also provided.

Figure 24A:
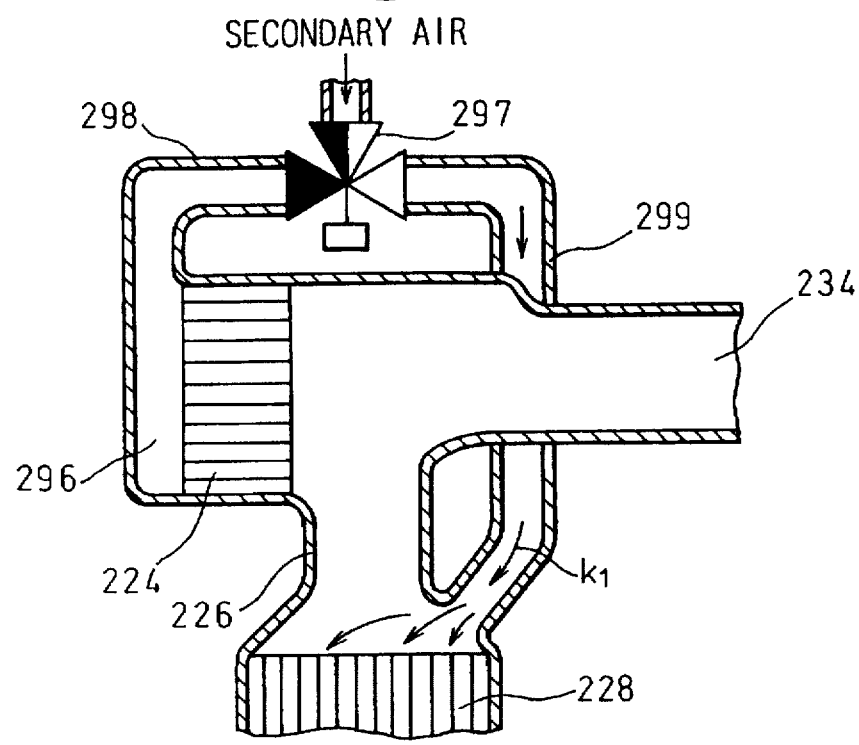
FIG. 24A is a partial enlarged view of FIG. 22, illustrating an operation during a cold start condition of the engine.

Now, an operation of this embodiment will be explained with reference to a flowchart in FIG. 23. At step S1, the ignition switch is turned ON. At step S2, it is determined if the engine is in a cold condition. When a determination that the engine is cold is obtained, the routine goes to step S3, where the switching valve 297 is switched to the pipe 299, and to step S4, where the air pump 275 is made ON. As a result, secondary air is introduced into the catalytic converter 228, as shown by arrows $k_1$ in FIG. 24A, in such a manner that a ratio of the amount of the secondary air to the intake air amount to the internal combustion engine is maintained constant. Due to the introduction of the secondary air, a lean atmosphere is obtained at the catalytic converter 228 just after the cold start of the internal combustion engine, which allows an oxidation reaction to occur early. Step S5 illustrates the starting of the engine.

Figure 24B:
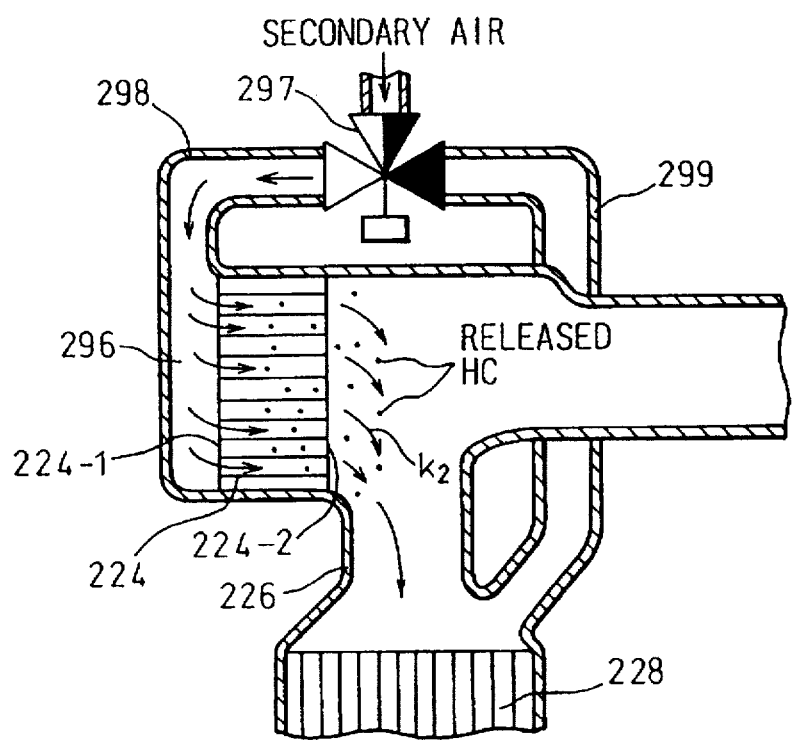
FIG. 24B is similar to FIG. 24A, but illustrates an operation during a desorption operation in the adsorption unit.

During the start-up of the internal combustion engine, the HC components in the exhaust gas contact the adsorption unit 224 and are captured thereby. After the full combustion state of the engine begins, a flow of the gas in the adsorption unit 224 is substantially suppressed, so that the captured HC components are retained in the adsorption unit 224. At step S6, it is determined if the temperature T' of the catalytic converter 228 is higher than the predetermined activation temperature T' When a determination that the temperature $T_1$ of the catalytic converter 228 is higher than the predetermined activation temperature T' the routine goes to a step S7, where it is determined that the engine is in a feedback condition where an air-fuel ratio feedback control is executed. When it is determined that the engine is in the air-fuel ratio feedback control condition, the routine goes to step S8, where an air-fuel ratio feedback control is executed. Then, at step S9, switching of the valve 297 is executed, so that the pipe 298 is connected. In other words, secondary air from the air pump 275 is introduced into the cooling chamber 296. In this case, as shown in FIG. 24B, the secondary air from the chamber 296 is introduced into the adsorption unit 224 from its rear surface 224-1. Then, the secondary air is passed axially through the adsorption unit 224 and is, from its from surface 224-2, discharged to the exhaust passageway. Due to the fact that the temperature of the adsorption layer of the adsorption unit 224 has already reached the desorption temperature of about 100° C., to release the captured HC gas, the released HC components in the adsorption unit 224 are entrained by the flow of the secondary air and are conveyed to the catalytic converter 228, as shown by arrows $k_2$ in FIG. 24B, which allows the unburnt HC components to be purified.

In the operation of this embodiment, the amount of the secondary air is sufficiently smaller than that of the amount of the exhaust gas such that an amount of heat removed, by the secondary air, from the HC adsorption material is smaller than the amount of the heat supplied to the HC adsorption material from the exhaust gas, which allows the temperature of the HC adsorbent to be gradually increased. When an increase in a temperature T of the adsorption unit 224, to the predetermined temperature $T_1$ of about 400° C. where the HC adsorption operation at the unit 224 is substantially stopped, a result of the determination in step S10 in FIG. 23 must be "YES". Thus, the routine goes to step S11, where the air pump 275 is stopped.

In the above embodiment, the introduction of the secondary air into the adsorption unit 224 can promote the efficiency in the desorption of HC components from the adsorbent in the adsorption assemblies 224, thereby allowing a desorption capacity to be increased. In other words, a complete desorption of HC component captured in the adsorption unit 224 can be obtained, which otherwise causes the latter to be clogged thereby reducing the HC adsorption capacity.

We claim:

1. An apparatus for purifying an exhaust gas for an internal combustion engine including an engine body with an exhaust port and an exhaust passageway for receiving the exhaust gas from the exhaust port, the apparatus comprising:

means arranged at a location facing the exhaust port for adsorption of unburnt components in the exhaust gas from the exhaust port;

catalyst means arranged in the exhaust passageway at a location downstream from the adsorption means for purifying the unburnt components in the exhaust gas;

means for selectively cooling the adsorption means in response to a control signal; and means for controlling the cooling means by generating the control signal when a condition of the engine requires the cooling, of the adsorption means.

2. An apparatus according to claim 1, wherein the controlling means comprises:

a sensor for detecting a temperature of the catalyst means, means for determining whether the temperature of the catalyst means is lower than an activating temperature thereof, and means for issuing the control signal indicating that the cooling of the adsorption means is required when a determination of the determining means is obtained.

3. An apparatus according to claim 1, wherein the controlling means comprises:

a sensor for detecting a temperature of the adsorption means, means for determining whether the temperature of the adsorption means is higher than a predetermined temperature, and means for issuing the control signal indicating that a cooling of the adsorption means is required when a determination of the determining means is obtained.

4. An apparatus according to claim 1, wherein the cooling means comprises:

a cooling fan located adjacent to the adsorption means outside of an exhaust manifold, and means for, upon the determination that a cooling of the adsorption means is required, operating the cooling fan for generating a flow of an air for cooling the adsorption means.

5. An apparatus according to claim 1, wherein the cooling means comprises:

a passageway for an air flow arranged so that a heat exchange occurs between the air flow and the adsorption means, an air pump connected to said passageway, and means for, upon the determination that a cooling of the adsorption means is required, operating the air pump for generating the air flow in the passageway.

6. An apparatus for purifying an exhaust gas for an internal combustion engine including an engine body with exhaust ports, an exhaust manifold, and an exhaust passageway for receiving the exhaust gas from the exhaust manifold, the apparatus comprising:

adsorption units arranged in the exhaust manifold at locations facing respective ones of the exhaust ports for the adsorption of unburnt components in the exhaust gas from the exhaust ports;

a catalytic converter arranged in the exhaust passageway at a location downstream from the adsorption units for purifying unburnt components in the exhaust gas;

means for selectively cooling the adsorption units in response to a control signal; and means for controlling the cooling means by generating the control signal when a condition of the engine requires a cooling of the adsorption unit.

7. An internal combustion engine comprising:

an engine body including cylinders and intake and exhaust ports connected to respective ones of the cylinders;

an intake manifold connected to the intake ports for introducing an intake air into the respective ones of the cylinders;

fuel supply means for supplying fuel so that a combustion of the fuel takes place in the cylinders;

an exhaust manifold connected to the exhaust ports for receiving an exhaust gas from the cylinders;

an exhaust pipe communicating with the exhaust manifold for receiving flows of the exhaust gas from the exhaust manifold;

a catalytic converter arranged in the exhaust pipe for purifying the exhaust gas;

adsorption units arranged in the exhaust manifold so as to face respective ones of the exhaust ports for adsorption of unburnt components in the exhaust gas discharged from the respective ones of the exhaust ports;

means for selectively cooling the adsorption units in response to a control signal; and means for controlling the cooling means by generating the control signal when a condition of the engine requires a cooling of the adsorption units.

8. An apparatus according to claim 1, wherein the controlling means comprises:

a sensor for detecting a temperature of the adsorption means, and a control circuit for controlling an operation of the cooling means in accordance with the temperature of the adsorption means detected by the sensor.

9. An apparatus according to claim 1, wherein the controlling means comprises:

a sensor for detecting a temperature of the catalyst means, and a control circuit for controlling an operation of the cooling means in accordance with the temperature of the catalyst means detected by the sensor.

10. An apparatus for purifying an exhaust gas for an internal combustion engine including an engine body with an exhaust port and an exhaust passageway for receiving the exhaust gas from the exhaust port, the apparatus comprising:

an adsorption unit for adsorption of unburnt components in the exhaust gas arranged at a location facing the exhaust port;

a catalytic converter arranged in the exhaust passageway at a location downstream from the adsorption unit;

a temperature sensor for detecting a temperature of one of the catalytic converter and the adsorption unit and generating a temperature signal indicating the temperature;

a controller receiving the temperature signal and generating a control signal when a condition of the engine requires a cooling of the adsorption unit; and a cooling device located adjacent to the adsorption unit, the cooling device being activated when the control signal from the controller is received.

11. An apparatus according to claim 10, wherein the controller comprises a microcomputer.

12. An apparatus according to claim 10, wherein the cooling device comprises a fan.

13. An apparatus according to claim 10, wherein the temperature sensor detects the temperature of the catalytic converter.

14. An apparatus according to claim 10, wherein the temperature sensor detects the temperature of the adsorption unit.

15. An apparatus according to claim 10, wherein the cooling device comprises a passageway and an air pump connected to the passageway, the passageway guiding a flow of air such that a heat exchange occurs between the flow of air and the adsorption unit.

16. An apparatus for purifying an exhaust gas for an internal combustion engine including an engine body with an exhaust port and an exhaust passageway for receiving the exhaust gas from the exhaust port, the apparatus comprising:

an adsorption unit for adsorption of unburnt components in the exhaust gas arranged at a location facing the exhaust port;

a catalytic converter arranged in the exhaust passageway at a location downstream from the adsorption unit;

a first temperature sensor for detecting a temperature of the catalytic converter and generating a first temperature signal indicating the temperature of the catalytic converter;

a second temperature sensor for detecting a temperature of the adsorption unit and generating a second temperature signal indicating the temperature of the adsorption unit;

a controller receiving the first temperature signal and the second temperature signal and generating a control signal when a condition of the engine requires a cooling of the adsorption unit; and a cooling device located adjacent to the adsorption unit, the cooling device being activated when the control signal from the controller is received.

* * * * *